United States Patent [19]

Chen

[11] 4,405,677
[45] Sep. 20, 1983

[54] POST TREATMENT OF PERPENDICULAR MAGNETIC RECORDING MEDIA

[75] Inventor: Tu Chen, Saratoga, Calif.

[73] Assignee: Xerox Corporation, Stamford, Conn.

[21] Appl. No.: 306,125

[22] Filed: Sep. 28, 1981

[51] Int. Cl.³ ...................... H01F 10/02; C23C 15/00
[52] U.S. Cl. .................................... 428/172; 156/656;
204/129.35; 204/129.55; 428/469; 428/694;
428/900
[58] Field of Search ............................... 428/900, 694;
204/192 M, 129.35, 129.55; 156/656, 664;
427/128, 130

[56] References Cited

U.S. PATENT DOCUMENTS 4,239,835 12/1980 Iijima et al. ..................... 428/900

Primary Examiner—Bernard D. Pianalto
Attorney, Agent, or Firm—W. Douglas Carothers, Jr.

[57] ABSTRACT

A method of post treatment to a continuous thin film magnetic medium designed for perpendicular recording comprising a substrate upon which is deposited a thin magnetic layer comprising acicular shaped crystalline magnetic particles with the crystallographic "c" axis of the crystal in each particle oriented parallel to the longitudinal axis of the particle acicula and the longitudinal axis of the acicular particles oriented substantially normal to the plane of said magnetic layer, the post treatment effectively increasing the separation between magnetic particles and thereby increasing their coercivity while decreasing their demagnetization field of the film. The method comprises the step of utilizing enhanced grain boundary reaction at the interganular boundary of the acicular particles either by diffusing the magnetic layer with a reagent or etching the magnetic layer with an etching agent. The magnetic layer may be initially fabricated, for example, by an electrochemical plating, sputtering or vaccuum deposited method.

9 Claims, 34 Drawing Figures

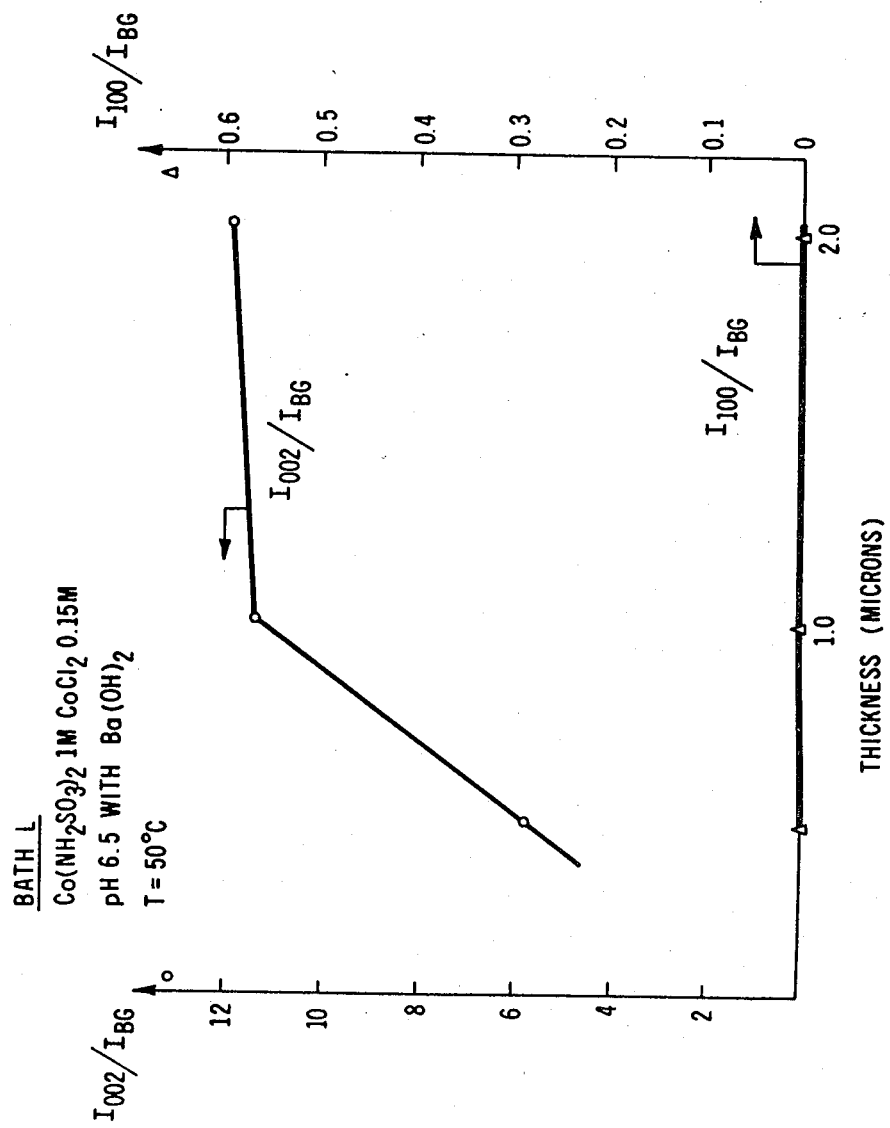

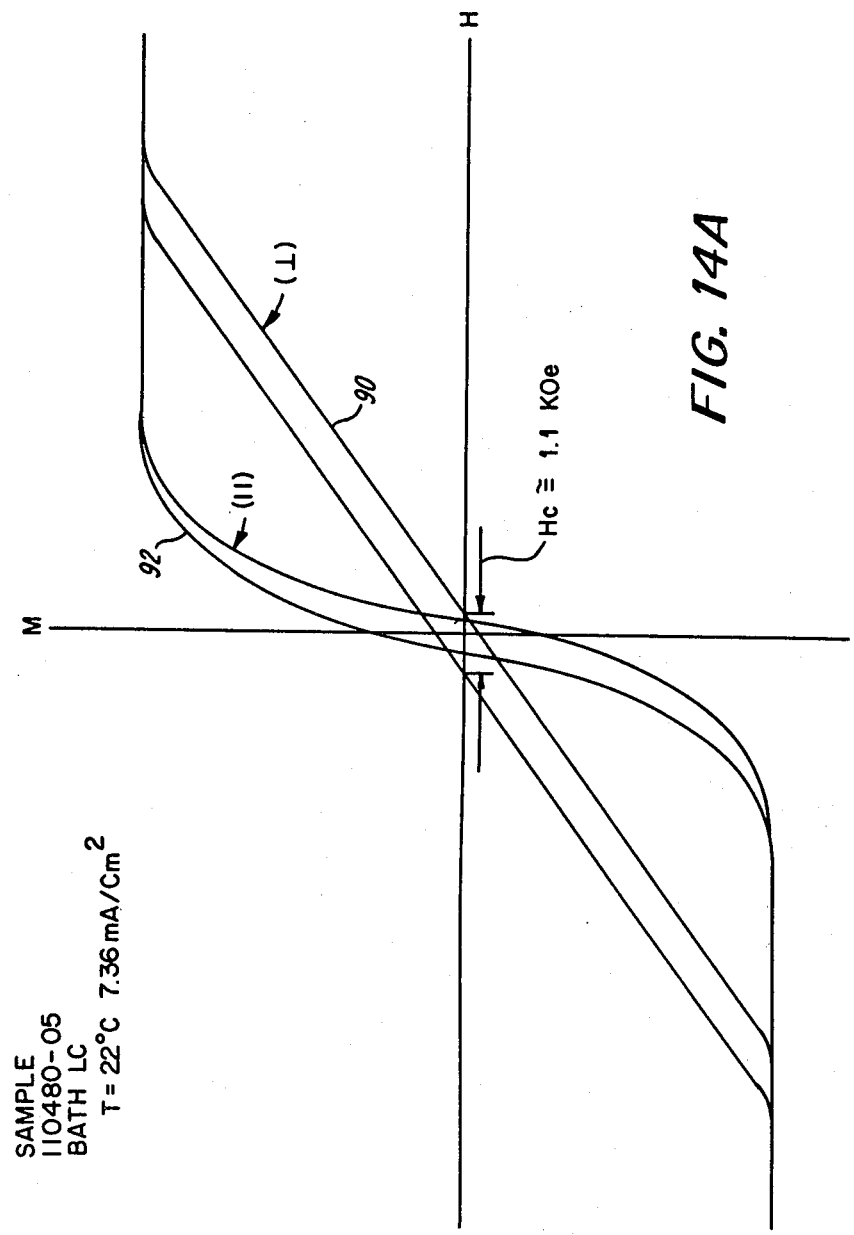

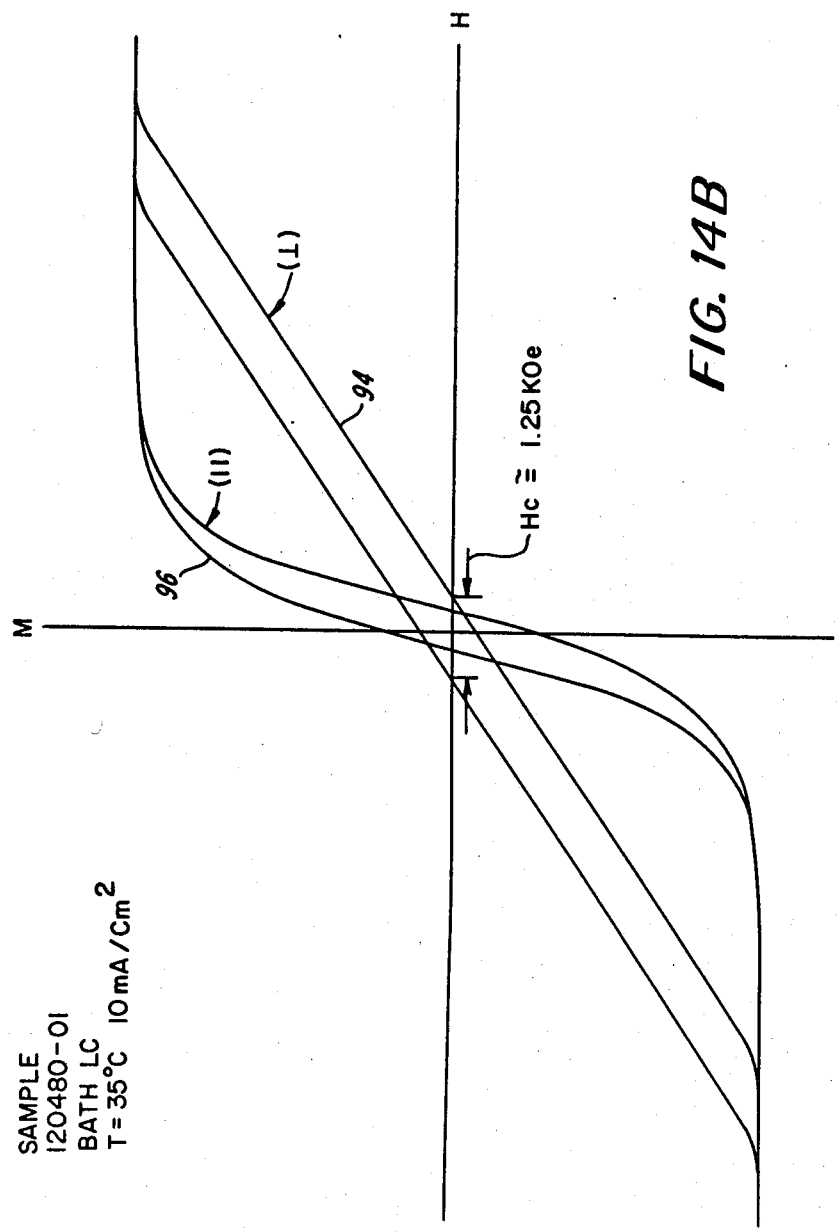

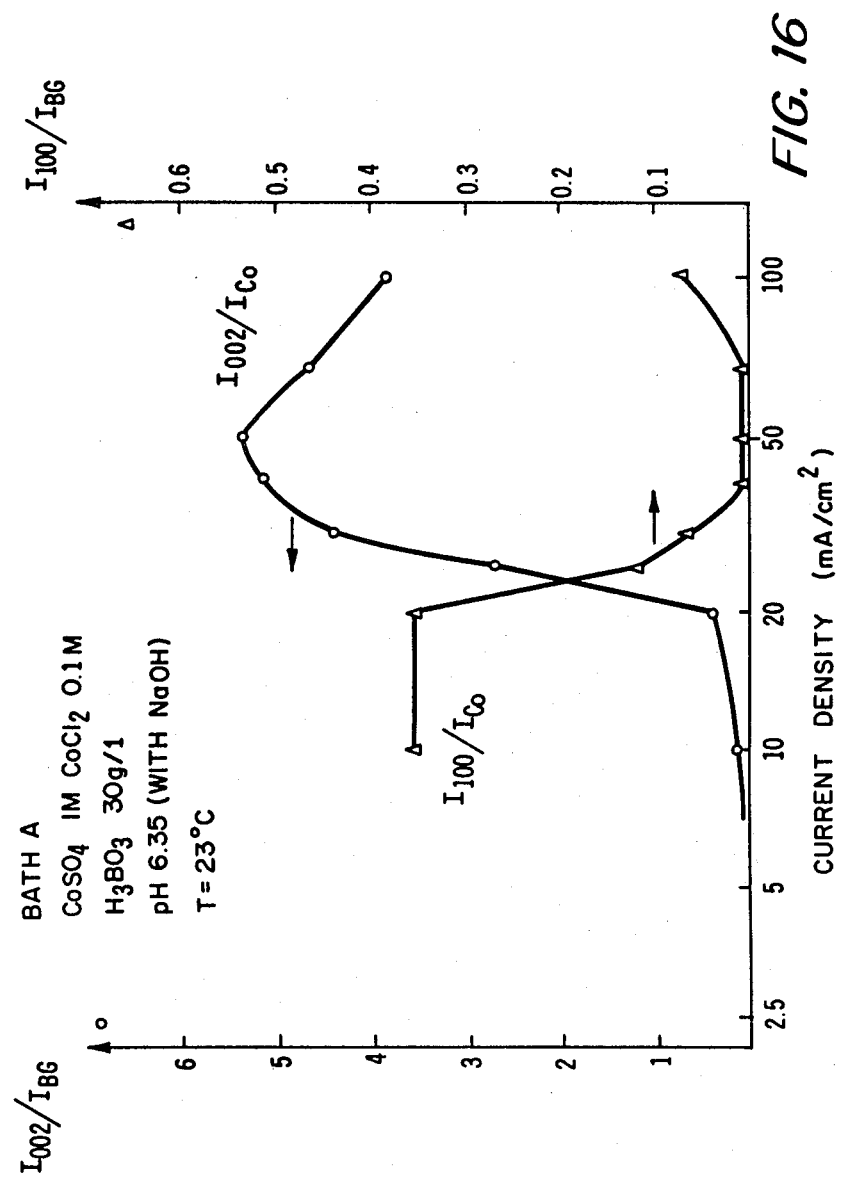

POST TREATMENT OF PERPENDICULAR MAGNETIC RECORDING MEDIA

BACKGROUND OF THE INVENTION

1. Field of the Invention

This invention relates to a magnetic recording medium and methods of post treatment of the magnetic layer of such media after initial media fabrication to improve their perpendicular magnetization for high density recording of signals.

2. Description of the Prior Art

In the technology of conventional magnetic recording using tape, sheet or disk recorders in video, audio or other digitized information storage, the signals are recorded on a magnetic recording layer formed on a nonmagnetic base by magnetizing the layer in the plane of the film in a longitudinal direction, which direction is parallel to the direction of relative movement of the medium to the recording transducer or head. This has been referred to as the longitudinal magnetization mode. In a recording process, the information (or bits) to be stored is recorded by changing the state or direction of the magnetization, i.e., a bit of information is created by reversing the magnetization direction of the magnetic medium or creating a flux reversal. When recording in the longitudinal magnetization mode, a strong demagnetization field is created between oppositely magnetized areas on the medium. The existence of this demagnetization field in the longitudinal magnetization recording mode causes attenuation and rotation of the residual magnetization, with the result that an attenuated output is obtained in reproducion of the recorded signal. This attenuation and signal deterioration is accentuated as the linear packing density is increased or the wavelength of recorded signals is decreased in the direction of longitudinal magnetization. The consequence is a limitation on the maximum recording density capable in the longitudinal magnetization mode.

If the magnetic layer can support principally a magnetization normal to the film plane at the remnants, then, if signals are recorded by reversing the magnetization direction in the direction normal to the surface of the magnetic layer following the pattern of the signal (i.e., recording in the so-called perpendicular magnetization mode), decreasing the wavelength of the recorded signal, as by increasing the recording density, causes a reduction in the demagnetizing field. Therefore, it will be appreciated that, for an increase in the density of information to be stored in a given area of the magnetic recording medium, recording in the perpendicular magnetization mode (hereinafter referred to as perpendicular recording) is more advantageous than the conventional recording using longitudinal magnetization mode (hereinafter referred to as longitudinal recording).

In order to overcome the problems associated with the existing proposed methods of producing a magnetic recording medium for perpendicular recording, an alternative method to produce such magnetic recording media having a highly oriented easy axis of magnetization perpendicular to film plane for perpendicular recording medium and which can be fabricated at an extremely low cost, rendering it highly adaptive to and competitive for a multitude of perpendicular recording applications. Although this method is explained in detail herein, the subject matter thereof is the basis of patent application Ser. No. 306,127 filed Sept. 28, 1981 and filed concurrently herewith. This invention relates to post treatment of such media to enhance the perpendicular magnetization hysteretic properties. Other post treatment techniques are the subject matter and basis of patent application Ser. No. 306,126 filed Sept. 28, 1981, and filed concurrently herewith.

SUMMARY OF THE INVENTION

According to this invention, the method of this invention relates to post treatment to a continuous thin film magnetic medium comprising a substrate upon which is deposited a thin magnetic layer comprising acicular shaped crystalline magnetic particles with the crystallographic "c" axis of the crystal in each particle oriented parallel to the longitudinal axis of the particle acicula and the longitudinal axis of the acicular particles oriented substantially normal to the plane of said magnetic layer. The post treatment method increases the separation between magnetic particles of the film and thereby increases their coercivity, $H_c$, while decreasing their demagnetization field, $H_d$. The method comprises the step of utilizing enhanced grain boundary reaction at the interganular boundary of said particles to achieve particle separation effectively either by diffusing the magnetic layer with a reagent or etching the magnetic layer with an etching agent.

According to this invention, various kinds of post treatment to thin magnetic films or layers, such as, Co or Co alloy based thin magnetic films, can improve the magnetization properties of the thin films by providing large intergranular separation between the perpendicular particles of the magnetic layer and further enhance the perpendicular magnetization hysteretic properties of perpendicular recording medium. The magnetic media comprise a magnetic layer of acicular shaped crystalline particles with the crystallographic "c" axis of the crystal in each particle oriented parallel to the long axis of the acicular particles, which particles are substantially normal to the plane of the magnetic layer. The treatments are not limited to the particular method of fabrication discussed herein but are applicable to other perpendicular recording media fabricated by other methods, such as, sputtering or vaccuum deposition, as long as the resultant film has the above mentioned perpendicular anisotropic properties. These treatments are based on the principles of enhanced grain boundary diffusion and enhanced grain boundary etching.

The above and other objects, features and advantages of the invention will become more apparent and appreciated by referring to the following description and claims taken in conjunction with the accompanying drawings.

BRIEF DESCRIPTION OF THE DRAWINGS

FIG. 10C is a graphic illustration of the diffraction intensity ratios at the second bath temperature vs. the thickness of the sample having perfect preferred orientation in Example 1 in $\mu$m.

FIG. 14A discloses the traces of the M-H hysteresis loops taken with applied magnetic field parallel ( $\|$ ) and perpendicular ( $\perp$ ) to the film plane of an magnetic film sample having a perfect preferred orientation of FIG. 13 electroplated at the first bath temperature.

FIG. 14B discloses the traces of the M-H hysteresis loops taken with applied magnetic field parallel ( $\|$ ) and perpendicular ( $\perp$ ) to the film plane of an magnetic film sample having a perfect preferred orientation of FIG. 13 electroplated at the second bath temperature.

FIG. 16 is a graphic illustration of the diffraction intensity ratios vs. current density for magnetic film sample obtained from a sulfate base electroplating bath at the first temperature, as compared to previous examples, for the film samples of Example 4 and indicative of the preferred orientation of the film particles for a range of film samples.

DESCRIPTION OF THE PREFERRED EMBODIMENTS

1. Electroplating of Preferred Oriented Co and Co-Based Alloys to Produce Magnetic Films for Perpendicular Recording.

Figure 1:
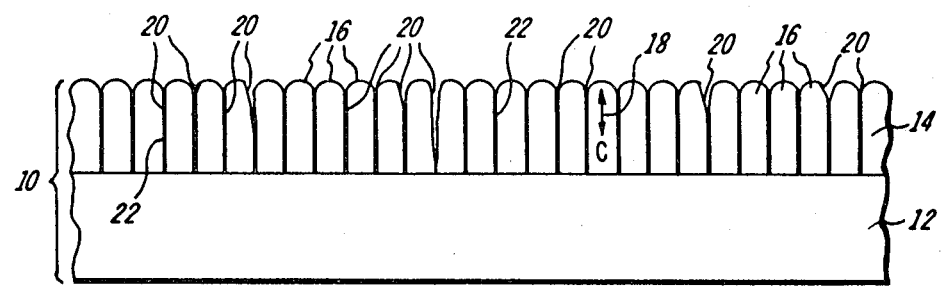
FIG. 1 is a schematic illustration of the side elevational view of the medium of this invention illustrating the acicular shaped microcrystal and the crystal orientation of the particles with the easy axis of magnetization perpendicular to the surface of the layer.

FIG. 1 illustrates a magnetic recording medium 10 comprising this invention. This illustration is materially enlarged for purposes of better understanding the microstructure and properties of the magnetic recording layer 14. Layer or film 14 is deposited on the conductive support 12 by an electrochemical plating process. The conditions of the plating process should be selected such that the microstructure of the resulting magnetic film 14 will result in a multitude of substantially uniform acicular or columnar shaped crystallites or particles 16, with both the longitudinal axis of the acicula and the crystallographic "c" axis 18 of the particles 16 oriented perpendicular to the plane of the film.

The crystalline materials comprising the film 14 under discussion here in and the later examples are HCP Co or Co based alloy particles. Examples of Co based alloys are CoRe, CoCr and CoNi.

The film particles 16 are physically separated by impurities or voids 20 which exist in the grain boundary 22 between particles. If the medium consists of isolated acicular particles 16 having both the preferred oriented columnar shape and the crystal anisotropy shown in FIG. 1, the magnetic layer or film 14 will have strong uniaxial anisotropy with the easy axis of magnetization normal to the film plane, which renders the electroplated film highly suitable for perpendicular recording. By "perfect preferred anisotropy", it is meant that the particles 16 have their crystal "c" axis 18 orientation substantially along the longitudinal axis of each acicular particle as well as the longitudinal axis of each acicular particle 16 are aligned normal (substantially perpendicular) to the plane of the film 14.

Figure 2:
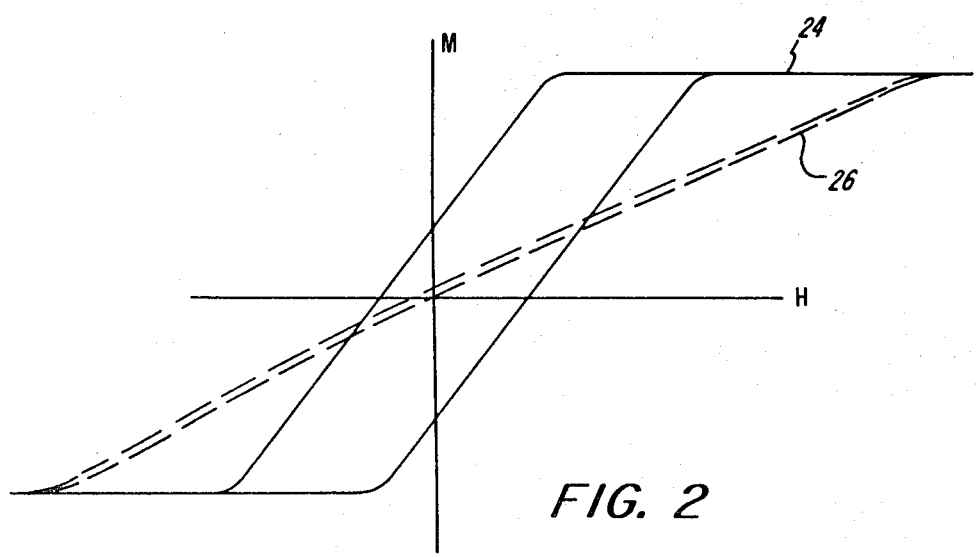
FIG. 2 is a graphic illustration of an idealized perpendicular and in-plane M-H loops, including the demagnetization field.

FIG. 2 illustrates the ideal magnetic hysteresis loop representing the relation between the applied magnetic field, H, and magnetization, M, of the recording layer, as measured by a vibrating sample magnetometer over a large area of a film. Hysteresis loop 24 in solid line represents the ideal hysteresis characteristic for the perpendicular ($\perp$) magnetization direction when the magnetic film has a uniaxial anisotropy normal to the film plane and hysteresis loop 26 in dotted line represents the ideal hysteresis characteristic for the longitudinal ($\parallel$) magnetization direction of the same film. The ideal perpendicular hysteresis loop 24 of the bulk film would be a parallelogram, i.e., slanted from a rectangular parallel pipe due to the demagnetizing field ($H_d$) effect along the direction opposed to the easy magnetizing direction.

Figure 3:
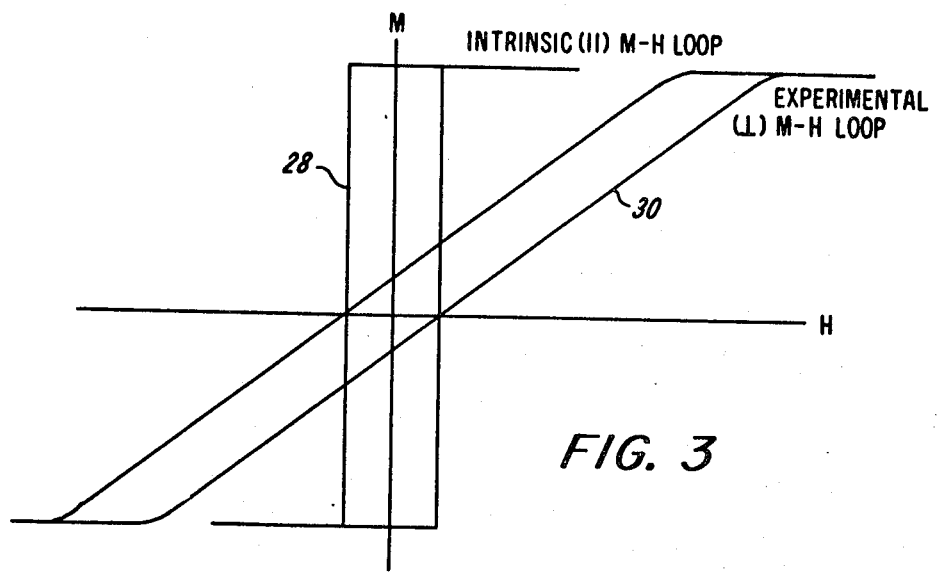
FIG. 3 is a graphic illustration of an experimental perpendicular M-H loop, including the demagnetization field and the intrinsic M-H loop after the demagnetization field was reduced from the experimental M-H loop.

If one considered only an individual magnetic particle without the demagnetizing field effect from the bulk of the film, the intrinsic hysteresis loop of the particle for a high uniaxial anisotropic film should be of excellent rectangular shape without any slanting, as illustrated by the hysteresis loop 28 in FIG. 3. For a high density recording or short wavelength, $\lambda$, recording, the linear distance between reversed magnetization becomes quite small and hence the demagnetizing field, $H_d$, within a single magnetized bit area reduces or approaches zero with shortening wavelength, $\lambda$. Consequently, the magnetic hysteresis loop of such a magnetized area under high density recording will behave as an intrinsic loop 28 illustrated in FIG. 3. The remnant, $M_r$, of the magnetized area will approach the valve of the saturation magnetization, $M_s$, of the magnetized area. It is this physical fact of correlating the magnetic hysteresis loop of the bulk film to the intrinsic loop of the magnetized bit area that impels the search for obtaining a better perpendicular recording medium by determining whether the perpendicular hysteresis loop of the bulk film, as measured from a vibrating sample magnetometer, results in a good parallelogram shaped hysteresis loop 30 of FIG. 3, which is similar shape to that represented by loop 24 of FIG. 2.

Basically, the slanting of the hysteresis loop 30 of the bulk film or long wavelength recording area, from the rectangular intrinsic loop 28 is caused by the demagnetizing field, $H_d$. In principle, the extent of the demagnetizing field, $H_d$, can be reduced by either decreasing the magnetization, $M_s$, of the media by means of doping with an alloy element, such as, Cr or Re, or by means of increasing the separation between the particles 16, i.e., increasing the magnitude of the grain boundary 22. In the case of reducing demagnetizing field, $H_d$, by doping of alloy element, the extent of the slanting cannot necessarily be reduced, whereas in the case of reducing demagnetizing field, $H_d$, by increasing separation between crystallites would decrease the extent of slanting drastically.

Figure 4A:
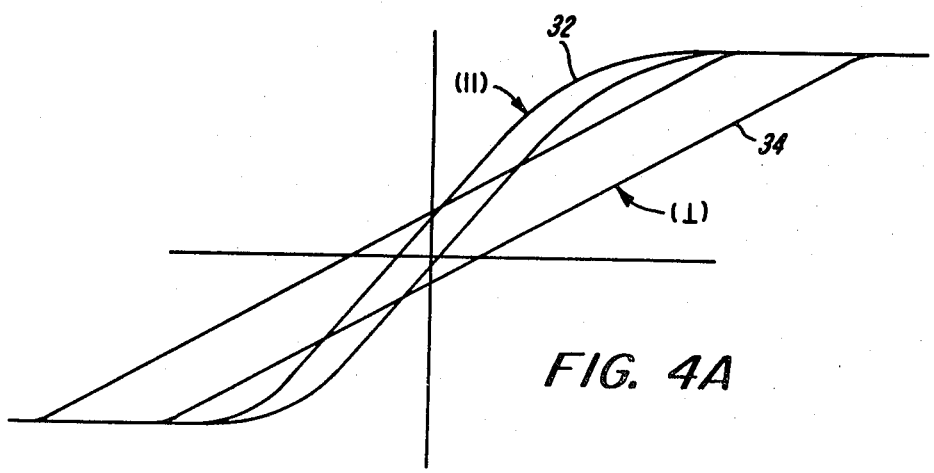
FIGS. 4A and 4B are both graphic illustrations of the M-H loop, including the demagnetization field, for practical recording media having desired perpendicular anisotropy.
Figure 4B:
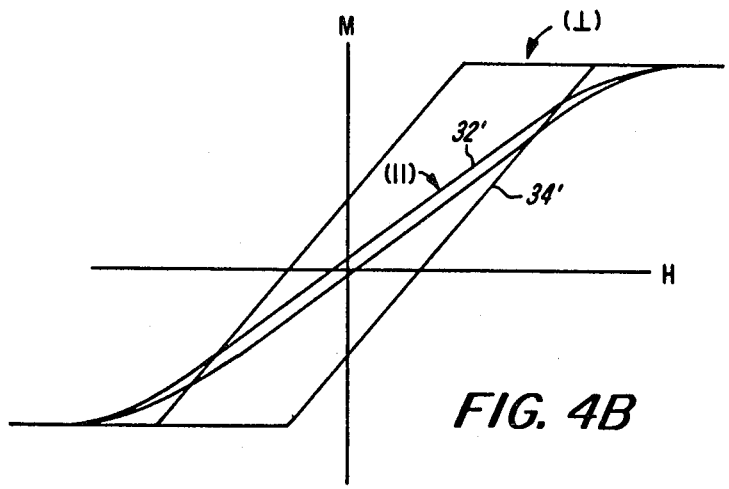

In general, for a practical and useful film having good perpendicular anisotropy but accompanied with a strong demagnetizing field, $H_d$, in the perpendicular direction, perpendicular magnetization hysteresis loops as measured from the bulk film, in practice, would show some inclination and the parallel loop would show some remanent. A typical example of these parallel ($\parallel$) and perpendicular ($\perp$) magnetization hysteresis loops are respectively illustrated in FIG. 4A as loops 32 and 34. The amount of the inclination and the relative inclination between the two loops is related to the strength of demagnetizing field, $H_d$, in the film. If the demagnetizing field in the perpendicular direction is reduced by increasing in interparticle separation, of the magnetic particles, then the perpendicular hysteresis loop 34 would decrease in inclination, as well as increasing in the coercivity, $H_c$, whereas the parallel hysteresis loop 32 would increase in inclination. The resultant relative position and shape of these parallel ($\parallel$) and perpendicular ($\perp$) hysteresis loops would be changed, for example, to look like the hysteresis loops 32' and 34' illustrated in FIG. 4B.

The decrease in the inclination and the increase in $H_c$ of the perpendicular loop 34 would imply that the medium could support a longer wavelength recording without causing self-demagnetization of magnetized areas, thereby increasing the reliability and accuracy of recorded bit information.

We have discovered an economical electroplating method for producing a magnetic recording film having the above-mentioned film properties with preferred oriented crystallities in both the shape and crystallographic directions while reducing the demagnetizing field, $H_d$, in the perpendicular direction by means of controlling the separation between acicular magnetic particles through the control of the plating conditions as well as enhanced by post treatment processes of the electroplated film.

Figure 5:
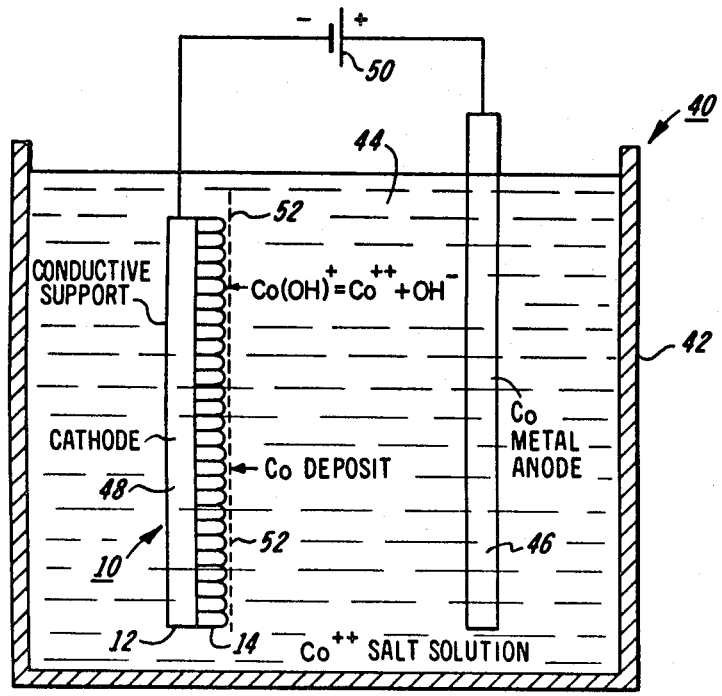
FIG. 5 is a schematic side view illustration of the electroplating apparatus used for practicing the method to produce perpendicular Co-based magnetic recording media in accordance with this invention.

The electroplating method for producing the film 14 can be carried out in the apparatus 40 shown in FIG. 5. A Co or Co-based alloy film 14 is formed from a plating bath 44 contained in the plating tank 42. For the case of a Co film, the plating electrolyte for bath 44 may comprise a cobalt salt solution, such as, for example, cobalt sulfate, cobalt chloride, cobalt sulfamate or cobalt perchlorate. Anode 46 may consist of a Co metal sheet. Cathode 48 comprises a conductive support, which is substrate 12. Electroplating is performed upon application of a voltage applied between anode 46 and cathode 48 supplied from a D.C. electrical current source 50. Under these electroplating conditions, the $Co^{++}$ ions in the bath solution will form the hydroxide ions, such as $Co(OH)^+$ or $Co_4(OH)_4^{4+}$, and move or migrate toward the cathode 49 to accept electrons and reduced the hydroxide ions to $Co°$ and deposit on substrate 12 (cathode 48) as Co metal, following the chemical reaction:

$$Co(OH)^+ + 2e \rightarrow Co^\circ(\text{deposited metal}) + OH^- \quad (1)$$

Figure 6:
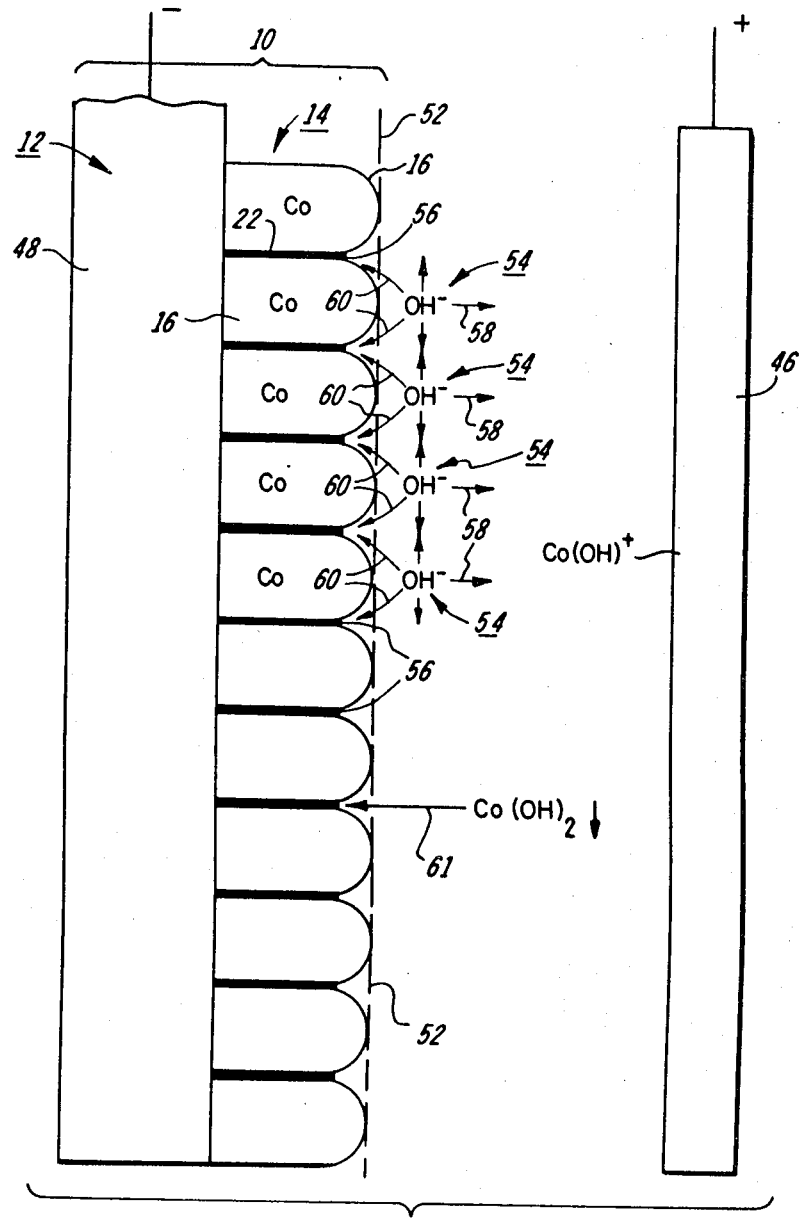
FIG. 6 is a detail illustration of mechanism of cellular growth to form columnar structures in the electroplating method comprising this invention.

In the chemical reaction of equation (1), accompanying the deposition of each metallic Co° atom on substrate 12, there will be a free $OH^-$ ion produced. As the deposition continues, there will be an excess $OH^-$ ion concentration at the particle growth interface 52 near or in proximity to the surface of the substrate. This excess $OH^-$ ion concentration is illustrated at 54 in FIG. 6. Referring to FIG. 6 and, following the principle of concentration-gradient, driven-diffusion mechansim associated in a chemical reaction processes, the excess $OH^-$ ion concentration 54, which is a concentration higher than that present in the bulk of the bath solution, at the particle growth interface 52 will migrate away from the center portion of the growth front 52 of the particles 16 into the bulk of the bath solution 44, as illustrated by arrows 58 in FIG. 6. Also this migration will occur into the intergranual boundary regions 56, i.e., at the edges between adjacent particles 16 near the particle growth interface 52, as illustrated by arrows 60 in FIG. 6, where no real or significant Co° deposition occurs.

It is known that in a cobalt salt solution, if the pH value (pH being indicative of the concentration of $H^+$ and $OH^-$ ions) in the solution is near or exceeds a value of about 7, the $Co(OH)^+$ ions in the solution would precipitate out of solution as $Co(OH)_2$ following the chemical reaction:

$$Co(OH)^+ + OH^- \rightarrow Co(OH)_2 \downarrow \quad (2)$$

at $pH \gtrsim 7$

If the electroplating bath has a pH of less than 7, for example, about 6 or 6.5, then there will be no $Co(OH)_2$ precipitation occurring in the bulk of the bath solution. However, during plating of the film from a bath having such a pH level, the concentration of $OH^-$ ions in the grain boundary regions 56 near the particle growth interface 52 would gradually build up because of the continuous migration of continually developed $OH^-$ ions at the particle growth interface 52 into the grain boundary regions 56 and bulk solution 44, as previously described. If the accumulation of $OH^-$ ion concentration in the grain boundary regions 56 near the particle growth interface 52 becames high enough to cause the pH value of the solution in that region to exceed the value of approximately 7, then the precipitation of $Co(OH)_2$ in that region will occur. This precipitation is indicated by arrow 61 in FIG. 6. Under these particular growth conditions, a cellular or columnar type microstructure of Co particles can be produced. If the deposition of the particles is continued for a sufficient period of time until the film thickness is of the order of 1 μm or less, for example, the particles would have an acicular shape with the long axis of the acicula and the crystallographic "c" axis 18 of the HCP Co particles oriented preferentially normal to the film plane. Furthermore, the particles would be separated physically from the surrounding particles by a large integranual boundary 22. Within this intergranual boundary, there would be either deposited precipitates of non-magnetic $Co(OH)_2$ or voids left behind by unreacted solution. The deposited precipitates of non-magnetic $CO(OH)_2$ will form at the immediate regions of the integranual boundary 22, as indicated by arrow 61, because of the higher pH value at this point compare to the the bath solution bulk, i.e., the pH value at this region is above where Co-$(OH)_2$ precipitation will occur. However, the pH value of the bath solution bulk is still below the value at which the precipitation of $Co(OH)_2$ would occur in the solution bulk.

Generally, the width of the particles 16 and the extent of separation between the particles, i.e., the width of the intergranual boundary 22 in the plated film 14, may be controlled by varying the electroplating bath conditions, such as, by the concentration of $Co^{++}$ ions in the plating solution, pH value of the solution, the temperature of the electroplating bath or by the deposition rate of the particles as defined by the current density of the electroplating process. The length of the acicular particles 16 or the thickness of the film 14 is principally determined by the length of time of electroplating. The length to width ratio of the particles may be, for example, 3:1.

For the purpose of obtaining a practical perpendicular recording medium 10, the crystallites or particles 16 in the plated film 14 should not only have a strong perpendicular anisotropy to overcome the demagnetization energy but also the demagnetizing field in the particles should be reduced as much as possible, i.e., the inclination of the perpendicular hystersis loop should be as small as possible, and the coercivity, $H_c$, of the perpendicular hysteresis loop should be strong enough to support perpendicular magnetization but small enough to be within the acceptable limits of the applied magnetic field strength produced by a magnetic recording head.

To produce a film with strong uniaxial anisotropy, reduced demagnetizing field and controlled coercivity, the microstructures of the film, such as, the width and length of the acicular particles, the separation between the particles and the orientation of the crystallographic "c" axis and the long axis of the acicular particles, must be controlled. In principle, these microstructure parameters can be changed or controlled, based on the previously explained mechanism of electroplating, through controlled electroplating conditions, that is, the concentration of $Co^{++}$ ions, buffer solutions, pH values, bath temperature, current density and additional alloying elements in the form of ionic species in the bath solution.

Examples of the range of the plating parameters employed in the media and method of this invention, for purposes of illustration and not limitation, are as follows:

(1) $Co^{++}$ ion concentration in the bath solution: about 0.1 to 2 molar solutions.

(2) Buffer reagent: from no buffer reagent at all to about 0.5 molar $H_3BO_3$ or equivalent. The employment of a buffer reagent permits the utilization of higher current densities and, therefore, higher plating deposition rates.

(3) pH value: about 5 to 6.7 or near the maximum pH value before the precipitation of $Co(OH)_2$ will occur in the solution bulk.

(4) Bath temperature: from about room temperature (22° C. or 23° C.) to about 70° C.

(5) Current density: from about 1 to 200 mA/cm$^2$.

(6) Alloying elements: from no added alloying element to about 20% of secondary plating element ion in the Co plating solution. Examples of alloying elemental ions that may be used are $Ni^{++}$, $Cr^{++}$, $Re^{++}$, $Os^{++}$, $Ru^{++}$, $Pd^{++}$, $Mn^{++}$, $Mo^{++}$, $Cu^{++}$, or other elements that would form solid solutions with Co under electroplating conditions.

As an example of the preferred embodiment of the invention, the magnetic layer 14 contains substantially pure Co acicular shaped particles plated from simple Co salt solutions and having a total thickness, for example, of about 1000 angstroms to several microns.

2. Enhanced Grain Boundary Post Treatments of Electroplated and Other Types of Magnetic Films The selection of preferred plating parameters for producing a magnetic film having the prescribed particle microstructure can be selected in a wide range of conditions for each of parameters specified in the previous paragraph. However, if one chooses to reduce the demagnetization field, $H_d$, relative to each magnetic particle by increasing the separation between the acicular shaped particle rather than by reduction of the saturation magnetization through alloying, a post electroplating treatment may be employed to enhance the size of the grain boundary 22 between the particles. Several such post treatments are possible. These treatments are based on the principles of enhanced grain boundary diffusion and enhanced grain boundary etching. These treatments are explained in conjunction with the schematic illustrations of FIGS. 7 and 8.

Figure 7:
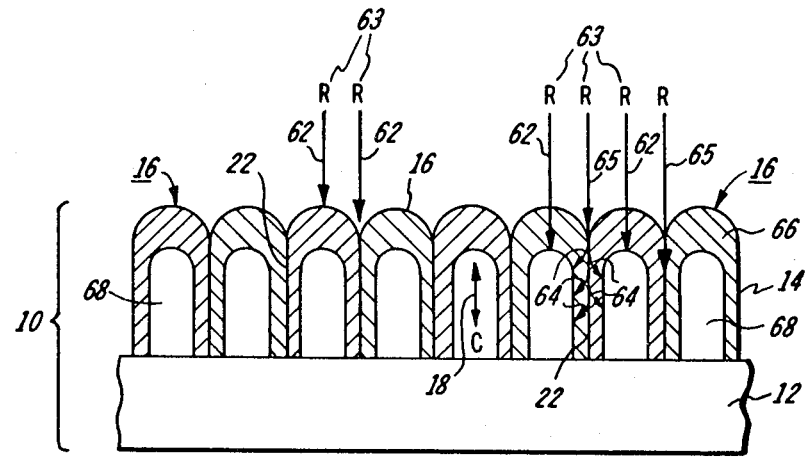
FIG. 7 is a schematic illustration of the microstructure of a magnetic film after being subjected to an enhanced grain boundary diffusion treatment to enlarge the intergranual separation between the magnetic particles.

FIG. 7 illustrates the change in particle microstructure during the enhanced grain boundary diffusion treatment of the electroplated film 14. A magnetic film 14 electroplated on the surface of the substrate 12 is placed in an environment comprising a reactant, R, and identified at 63. The reactant may be a gas, such as, hydrogen, oxygen, nitrogen or other diffusing agent or the vapor phase of an element that is dissimilar to the film material. If the kinetics for diffusion of the reactant 63 is sufficiently high, then the reactant 63 would undergo a solid state diffusion into the particle 16 of the film 14. This diffusion is either through the exposed surface of the particle and directly into the particle bulk, as indicated by the arrows 62, or initially through the grain boundary 22 and then into the particle bulk, as indicated by the arrow 64. As the reactant 63 diffuses into the Co or Co-based alloy particles 16, it forms a nonmagnetic phase compound or solid solution, identified as region 66, with the Co or Co alloy around the exterior regions of each particle, leaving the nondisturbed magnetic particle or core portion 68.

The diffusion of a second species into the particle will be more than one order of magnitude faster along the grain boundary 22 via path 65 than directly into the bulk of the particle via path 62 or transversely into the particle side walls via paths 64. Therefore, the enhanced grain boundary diffusion treatment will create a layer of nonmagnetic phase around each particle 16, illustrated by shaded region 66 of FIG. 7. Consequently, the untouched magnetic material in the core portion 68 of each particle which has not been exposed to the diffusion treatment will retain its original magnetic moment and acicular shape. The effective magnetic separation between adjacent magnetic core portions 68 of the particles 16 will be increased because of the formation of the nonmagnetic phase portion 66 in the region between the particle core portions 68. This increase in the separation between the original magnetic particles 16 will result in a reduction of the demagnetization field, $H_d$, of each particle and a corresponding increase in their coercivity.

In one of these enhanced grain boundary diffusion treatments, an oxidation treatment at elevated temperature can be employed. There are several advantages in employing this type of oxidation as a film post treatment. First, the heat treatment of the particles will subject them to an annealing effect. As a result, improved HCP Co alloy particles can, in principal, be achieved due to reduction in crystal strain and/or stacking faults in the particles. Secondly, the annealing effect would also increase the crystalline anisotropy. Third, the formation of the intergranular oxide along the grain boundaries and grain front of the particles provides a harder and more stable film, increasing its archival properties.

Figure 8:
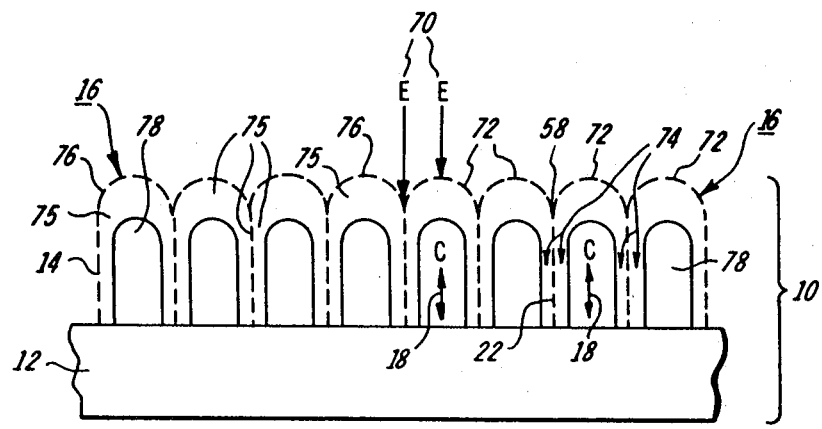
FIG. 8 is a schematic illustration of the microstructure of a magnetic film after being subjected to an enhanced grain boundary etching treatment to enlarge the intergranual separation between the magnetic particles.

Another post treatment for increasing the effective separation between the magnetic particles 16 is by employing enhanced grain boundary etching of the plated film 14 which is schematically illustrated in FIG. 8.

If polycrystalline materials, such as particles 16, are subjected to etching by a conventional chemical or electrochemical process with a properly selected chemical reagent, the rate of removal of total material is faster along the grain boundary 22 than at the regions on the surface of the particles 16, i.e., the region of terminated particle growth at interface 52 in immediate contact with the etching reagent. When an electroplated film 14 on an accompanying substrate 12 is placed in a chemical or electrochemical etching solution comprising an etching reagent, E, identified at 70 in FIG. 8, the reagent 70 immediately attacks the particle 16 at the grain front 72 at the surface of the particle as well as along grain boundary 22. In a film 14 comprising crystallographic "c" axis preferred oriented particles, the rate of removal of the magnetic material along the grain boundary 22 and in the vicinity or regions 74 of the grain boundary 22 would be greater than the grain front 72. This is because (1) the grain boundary 22 possesses higher free energy and, consequently, tends toward a greater rate of etching than the grain section proper of the particles and (2) the grain boundary 22 of the electroplated film includes inclusions, such as, Co-$(OH)_2$, which are highly soluble in the acid solution and, hence, open up the grain boundary regions for the attending etchant.

Consequently, the particle material 75, indicated by the dotted boundary portions 76, is removed from the particles 16, leaving a core portion 78 of each particle intact if the etching process is stopped at a proper time. The core portion 78 of the particles will retain their original magnetic movement and acicular shape but have a larger interparticle separation as is evident from FIG. 8. The effective magnetic separation between adjacent magnetic core portions 78 of the particles 16 will be increased because of the removal of the portions 75 in the regions surrounding the particles. This increase in the separation between the magnetic particles will result in a reduction of the demagnetization field, $H_d$, of each particle.

It should be noted that particle separation may be further extended by a combination of either intergranular diffusion or oxidation and chemical etching.

It should be pointed out that the post treatments for electroplated films we propose here for the reduction of demagnetizing field of the particles by the enhanced grain boundary diffusion or enhanced grain boundary etching can also be applied to magnetic films initially prepared by other methods of fabrication, such as, for example, sputtered CoCr or CoRe alloy films or vacuum deposited magnetic alloy films, as long as the microstructure of the particles in the film exhibit columnar or acicular shaped structures with the longitudinal axis of the columnar or acicular particles and the "c" axis of the HCP particle crystal comprising the particles are oriented normal to the plane of the film.

The nonmagnetic substrates 12 that may be employed with the film 14 of this invention may take the form of a rigid support, for example, a rigid plate, disk, drum or sheet of aluminum or aluminum alloy, copper, brass or glass overcoated with a conductive metallic layer or the like. The metallic or non-metallic substrate may be overcoated (1) with a conductive nonmagnetic, hard metallic layer for increasing the mechanical properties of the resultant magnetic medium or (2) a conductive magnetic layer to provide high permeability and low coercivity, such as permalloy as proposed in U.S. Pat. No. 4,210,946, for increasing the effectiveness of recording and playback by a magnetic head. Alternatively, a nonmagnetic substrate may take the form of a flexible support, for example, a floppy disk or sheet or a tape of a synthetic resin film, comprised of a polyimide, polyethylene terephthalate, polycarbonate and the like, overcoated with a conductive metallic layer or the like, as previously mentioned for rigid supports.

3. Examples of Preferred Embodiments

The fabrication of magnetic recording media according to the invention will be further illustrated with reference to a specific examples. Examples 1 through 5 illustrate samples of the electroplating method. Examples 6 through 9 illustrate samples of post treatments. These examples are for purposes of clarity and exemplification of the claimed invention without intentionally placing precise limitations on its parameters and utility. Many different parameter choices can easily be made, as will be clear from an examination of the examples, as well as changed in magnitude relative to each other. In some cases, these parameters may be substituted or eliminated. In any event, the desired toto performance and function for recording media suitable for perpendicular recording will be obtained, as would be ordinarily appreciated by those skilled in the electroplating and in the magnetic recording technologies.

I. ELECTROPLATED FILMS

EXAMPLE 1

A nonmagnetic conductive support was used for the recording medium 10. The support comprised a glass substrate 12 overcoated with vacuum depostied Cr and Cu. This is followed by the deposition of a layer of nonmagnetic Ni-P which is deposited by conventional electroless process. The purpose of the Cr, Cu and Ni-P layers is to provide the substrate with good adhesion and electrically conductive properties to function as cathode 48 in the electroplating apparatus 40.

The conductive surface substrate was then placed as the cathode of the electroplating bath 44. A pure Co sheet was used as anode 46 for the bath 44. The plating bath solution comprised 1 molar/liter cobalt sulfamate, 0.15 mole/liter cobalt chloride, $CoCl_2$, and the pH of the solution was adjusted to the value of 6.5 using a saturated barium hydroxide solution. This bath was designated as "Bath L" for record purposes.

The Co platings were produced with current density in the range between 2.5 mA/cm² to 50 mA/cm² at two different bath temperatures of 23° C. and 50° C., as specified in the following Tables I and II.

TABLE I

| Samples plated from Bath L at 23° C. with pH = 6.5. | | | |
|---|---|---|---|
| Co Sample Number | Current Density | Film Thickness (w/i 0.2 μm) | Plating Time |
| 091680-04 | 2.5 mA/cm² | 1 μm | 20 min |
| 091680-07 | 5 mA/cm² | 1 μm | 10 min |
| 091680-05 | 7 mA/cm² | 1 μm | 7.9 sec |
| 091680-06 | 8.5 mA/cm² | 1 μm | 5 min 52 sec |
| 091680-03 | 10 mA/cm² | 1 μm | 5 min |
| 091680-10 | 20 mA/cm² | 1 μm | 2 min 30 sec |

TABLE II

| Samples plated from Bath L at 50° C. with pH = 6.5. | | | |
|---|---|---|---|
| Co Sample Number | Current Density | Thickness (w/i 0.2 μm) | Plating Time |
| 091980-03 | 5 mA/cm² | 1 μm | 10 min |
| 091980-01 | 10 mA/cm² | 1 μm | 5 min |
| 091980-09 | 10 mA/cm² | 1 μm | 5 min |
| 091980-07 | 10 mA/cm² | 0.5 μm | 2 min 30 sec |
| 091980-08 | 10 mA/cm² | 2 μm | 10 min |
| 091980-04 | 15 mA/cm² | 1.3 μm | 5 min |
| 091980-02 | 20 mA/cm² | 1 μm | 2 min 30 sec |
| 091980-06 | 30 mA/cm² | 1 μm | 1 min 40 sec |
| 091980-05 | 50 mA/cm² | 1 μm | 1 min |

Figure 9A:
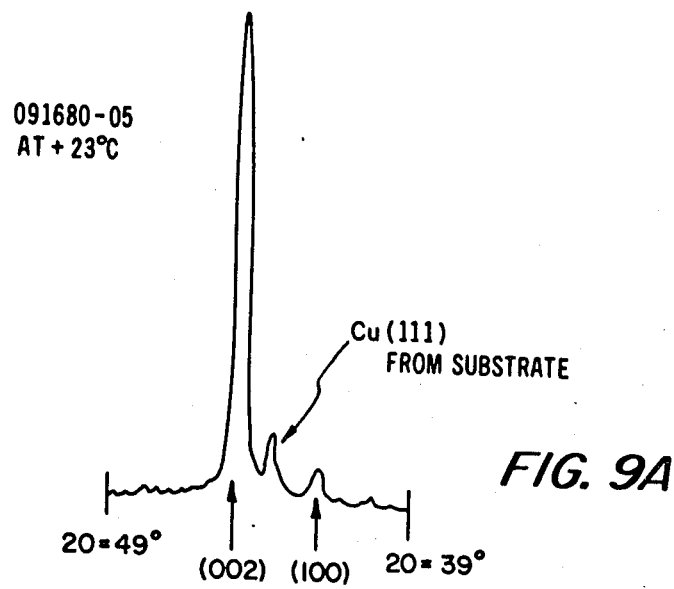
FIG. 9A is a trace of the x-ray diffraction from the surface of an electroplated magnetic film sample of Example 1 wherein some of the particles have their "c" axes oriented in the plane of the film rather than perpendicular to that plane.
Figure 9B:
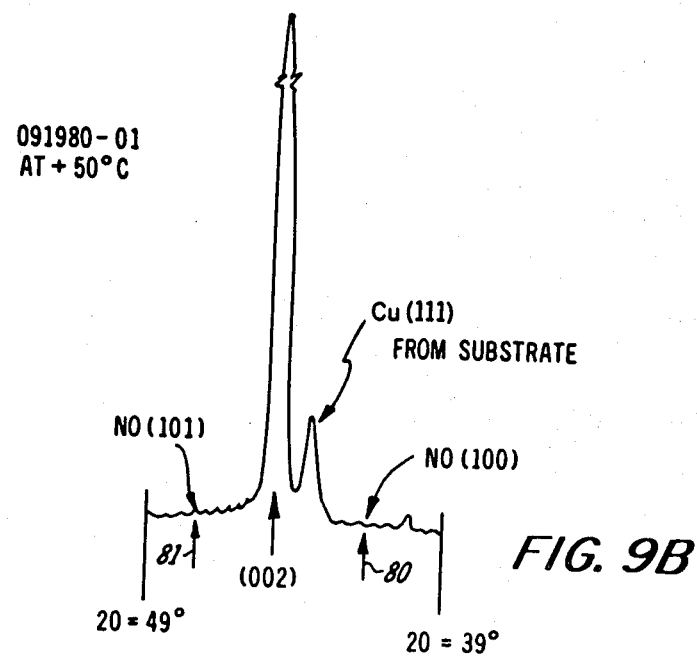
FIG. 9B is a trace of the x-ray diffraction from the surface of an electroplated magnetic film sample of Example 1 wherein all of the particles have their "c" axes oriented principally perpendicular to the plane of the film.

All the plated Co films were subjected to an x-ray diffraction measurement to determine the extent of the preferred orientation of the crystallites. Two typical traces of the diffraction patterns obtained are shown in FIGS. 9A and 9B for purposes of comparison. FIG. 9A is the diffraction pattern obtained from sample 091680-05 in Table I whereas FIG. 9B shows the diffraction pattern obtained from sample 091980-01 in Table II. Based on the results of the x-ray diffraction, the orientation of the particles in the Co film of the sample represented by FIGS. 9A and 9B can be interpreted as follows. In the case of FIG. 9A, even though most of the particles in the film show strong preferred orientation of the "c" axis of the HCP crystallites, oriented normal to the film plane as revealed by the strong (002) diffraction line, but there are also some crystallites in the film oriented with their "a" axis normal to the film plane as revealed by the presence of the (100) diffraction line in the pattern. On the other hand, for the sample represented by the pattern of FIG. 9B, all the crystallites in the film are oriented with their HCP "c" axis normal to the film plane as indicated by the very strong (002) diffraction and the lack of any other diffractions from the cobalt film in the diffraction pattern, particularly the lack of the (100) and (101) diffraction lines respectively at 41.5° and 47.5°, as indicated respectively by arrows 80 and 81. This means, then, that nearly all, if not fully all, the crystals are of preferred orientation desired for perpendicular recording.

Basically, the extent of preferred crystallographic orientation of the crystallites in the Co films can be identified from the relative intensity of the characteristic x-ray diffraction line of the HCP crystallite particles in the films. For example, the x-ray diffraction pattern of Co films having randomly oriented crystallites would show relative diffraction line intensities of 20%, 60% and 100% for the respective characteristic diffraction lines of (100) (002) and (101) crystallographic planes. For a film having preferred crystallographic orientation of the Co crystallites in the film, the relative peak intensity of these diffraction lines would be changed from that of a film having randomly oriented crystallites. When a film having the crystallites with the "c" axis oriented more preferred in a direction normal to the film plane than the case of random orientation, the corresponding diffraction intensity of the (002) line will be increased and the intensity of other diffraction lines would decrease from that of a Co film having randomly oriented crystallites.

Based on this principle, it is possible to quantize the extent of preferred crystallographic orientations of the crystallites in the films obtained from different plating conditions by measuring and determining the ratio of the peak intensity value of a given characteristic diffraction, such as, the (002), (100) or (101) diffraction lines, with the background fluorescence intensity at a given diffraction angle in order to normalize the intensity of the characteristic diffraction for a given film thickness.

Figure 10A:
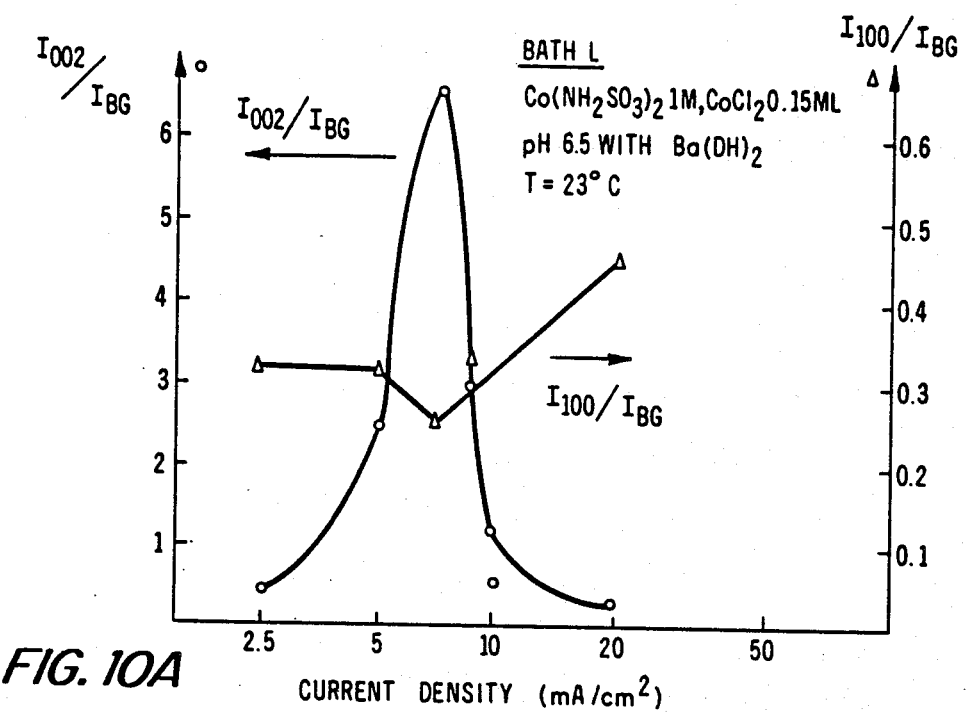
FIG. 10A is a graphic illustration of the diffraction intensity ratios vs. plating current density at a first bath temperature for the film samples of Example 1 and indicative of some strong preferred orientation of the particles in the film for a range of film samples.
Figure 10B:
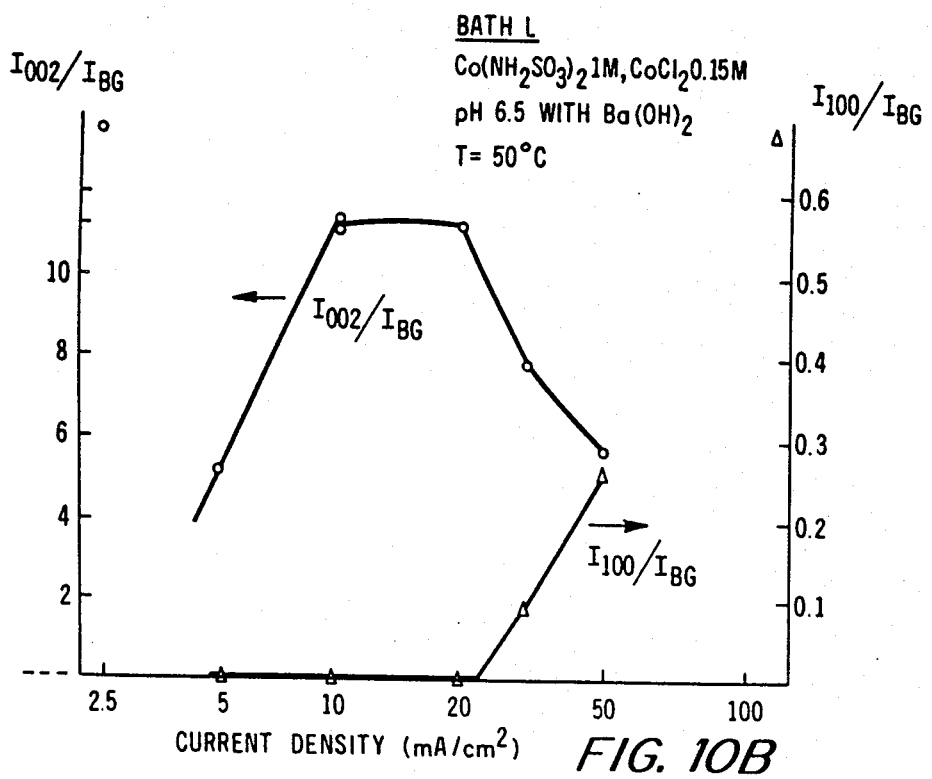
FIG. 10B is a graphic illustration of the diffraction intensity ratios vs. plating current density at a second bath temperature for the film samples of Example 1 and indicative of the perfect preferred orientation of the particles in the film for a range of film samples obtained from the same bath.

FIGS. 10A and 10B respectively show the diffraction intensity ratio $I_{(002)}/I_{BG}$ and $I_{(100)}/I_{BG}$, where $I_{(002)}$ and $I_{(100)}$ are the respective peak intensities of the (002) and (100) diffraction and $I_{BG}$ is the background intensity of the corresponding pattern taken at $2\theta = 39°$ diffractometer angle, employing Cu K$\alpha$ radiation as a function of the plating current density for the 1 $\mu$m thick Co films listed in Tables I and II.

As illustrated from FIG. 10A, even though the films plated from the bath at room temperature (23° C.-Table I) showed strong preferred orientation of a majority of the crystallites with their "c" axis normal to the film plane, as indicated by the strong $I_{(002)}/I_{BG}$ ratio, all the films showed some of the crystallites oriented with the "a" axis of the crystallites in the direction normal to the film plane, as revealed by non-existence of the $I_{(100)}/I_{BG}$ intensity ratio. Furthermore, careful analysis of the diffraction patterns of this series of Co films shows that there is a small diffraction intensity of the (101) diffraction line. This would indicate that the films also have some small amount of particle oriented with their crystallographic [101] axis normal to the film plane. On the other hand, an examination of FIG. 10B for Co films plated from same L Bath at 50° C. (Table II), the diffraction patterns show no (101) diffraction line. Also, when the plating current density was maintained below 20 mA/cm$^2$, the patterns show only a very strong (002) diffraction with higher intensity ratios as compared to FIG. 10A and, further, having no presence of either the (100) or (101) diffractions. These results indicate that the Co films plated in the L Bath below 20 mA/cm$^2$ current density should have perfect anisotropic orientation of all the crystallites in the film oriented with the "c" axis perpendicular to the film plane. The film having this kind of preferred anisotropy in crystal orientation are highly adaptable for perpendicular recording media applications. These samples demonstrate that preferred anisotropic orientation of the crystallites can be achieved by the electroplating method of this invention.

FIG. 10B further demonstrates that as the plating current density increases beyond 20 l mA/cm$^2$, the electroplated film begins to lose its preferred anisotropic orientation of the crystallites with the existence of some crystallites with their "a" axis normal to the film plane, as evident by the appearance of $I_{(100)}/I_{BG}$ intensity ratio in FIG. 10B above this current density point.

One can conclude from these results of Example 1, based on the x-ray diffraction analysis, that in employing this specific bath solution, Co films with preferred orientation, i.e. crystallographic "c" axis of all the crystallites in the film oriented normal to the film plane, may be obtained employing plating bath temperature of 50° C. and current density of between about 5 to 20 mA/cm$^2$. Furthermore, if the film is electroplated within this range of current density, for example, about 10 mA/cm$^2$ at 50° C., the preferred orientation can be produced for film thicknesses ranging from about 0.5 to 2 $\mu$m, as illustrated from the plot of the $I_{(002)}/I_{BG}$ and $I_{(100)}/I_{BG}$ ratios vs. film thickness from the data of FIG. 10c and Table II. Specifically, FIG. 10C is based on data obtained from samples 091980-07, 091980-08 and 091980-09 of Table II.

Figure 11B:
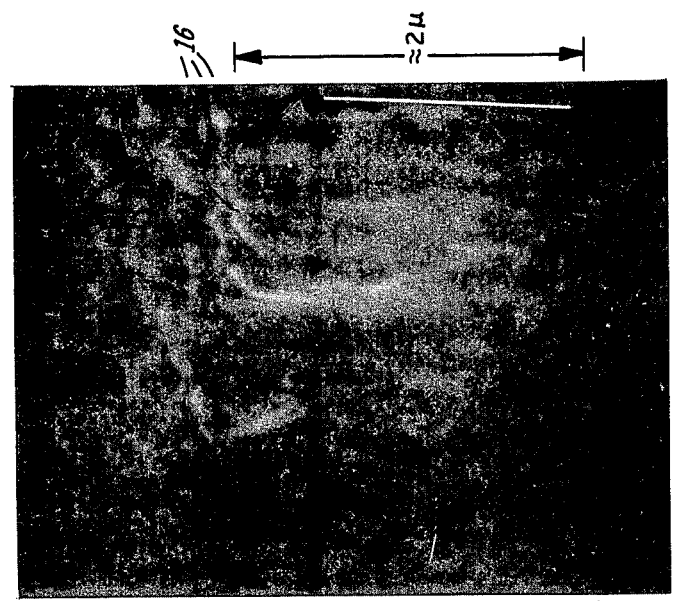
FIG. 11 is a scanning electron microscopic (SEM) image of an electroplated magnetic film supported on a substrate obtained from a fracture surface of a perfect preferred oriented film and illustrating the desired acicular or columnar shaped magnetic crystalline particles all oriented normal to the plane of the film.
Figure 11A:
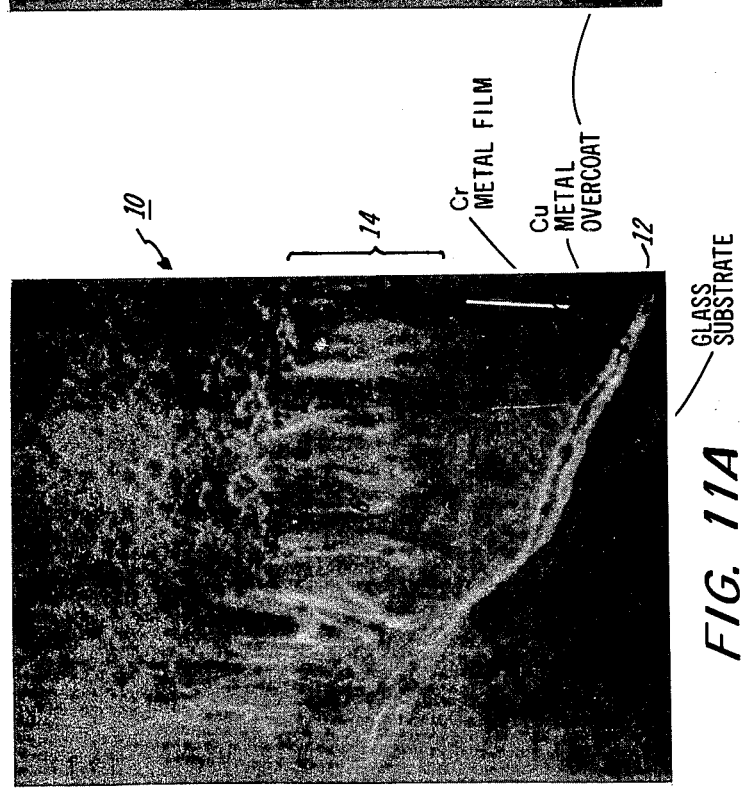

Examination of the microstructure of the films using a scanning electron microscope (SEM) shows that if a film has a preferred (002) orientation, the crystallites would have their acicular shape and the long axis of the acicular oriented also normal to the surface of the film, i.e., the long axis of the acicular parallel to the "c" axis of the crystallite. The width of the acicular crystallites can be varied from a few hundred to over a thousand angstroms, depending on the plating current density and bath temperature used during plating. The SEM microstructure of a typical film having this type of preferred orientation of both crystallographic and shape anisotropy normal to the film plane is shown in FIGS. 11A and 11B. The SEM microstructure, in this case, is taken from sample 091980-08 of Table II. FIG. 11B is an increased magnification of a portion of the structure shown in FIG. 11A.

Figure 12A:
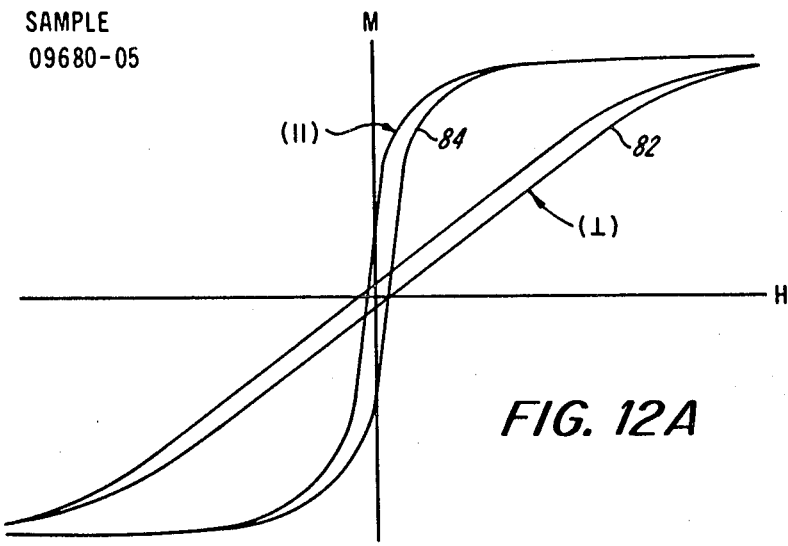
FIG. 12A discloses the traces of the M-H hysteresis loops taken with applied magnetic field parallel ( $\|$ ) and perpendicular ( $\perp$ ) to the film plane of an electroplated magnetic film sample of FIG. 9a, which has strong preferred orientation but having some particles with "c" axis oriented in the plane of the film plane.
Figure 12:
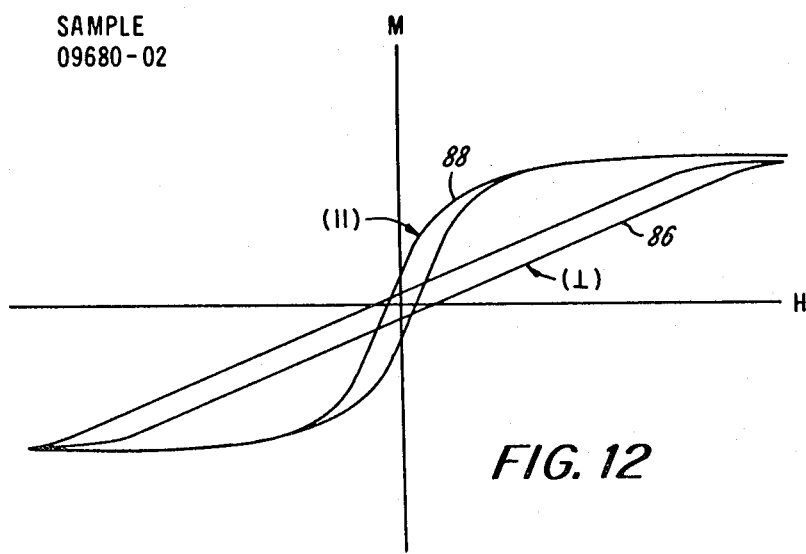
FIG. 12B discloses the traces of the M-H hysteresis loops taken with applied magnetic field parallel ( $\|$ ) and perpendicular ( $\perp$ ) to the film plane of an electroplated magnetic film sample of FIG. 9b which has perfect preferred orientation.

The perpendicular ($\perp$) magnetic hysteresis loops of a Co film having preferred orientation, i.e., a high (002) peak intensity and no or practically nonexistent (100) and (101) preferred orientation, shows good parallelogram definition with high coercivity, $H_c$, equal to about 1.2kOe, as shown in FIG. 12B. The perpendicular ($\perp$) and parallel ($\parallel$) hysteresis loops 86 and 88 are taken from sample (091980-02 of Table II. On the other hand, films having some crystallites oriented with their (100) or (101) axis normal to the film plane, which is the case for all the electroplated films In Table I and also for the films electroplated with a current density of greater than about 20 mA/cm$^2$ in Table II, show poorer parallelogram definition for the perpendicular parallel hysteresis loops as that shown by the example of loop 82 in FIG. 12A. The perpendicular and hysteresis loops 82 and 84 are taken from sample 091980-05 of Table I. Even though these films show strong (002) preferred orientation as indicated in FIGS. 10A and 10B, they exhibit poor parallelogram loops and lower coercivity values, such as, $H_c$ equal to about 0.75 kOe.

EXAMPLE 2

The same nonmagnetic conductive substrate 12 employed with the samples of Example 1 was employed with the samples of Example 2. The plating bath was also the same except for the molar content of the cobalt chloride. The plating bath solution comprised 1 molar cobalt sulfamate, 0.05 molar/liter cobalt chloride, $CoCl_2$, and the pH of the solution was adjusted by a 0.1 molar/liter Ba(OH)$_2$ solution to a value of 6.5. This bath was designated as, "Bath LC" for record keeping purposes.

Three series of samples were prepared at temperatures of 22° C., 35° C. and 50° C. The results of each of these sample series is shown in Table III, IV and V.

TABLE III

Series 1 Samples plated from Bath LC at 22° C. with pH = 6.5.

| Co Sample Number | Current Density | Total Plating Time (w/i 1 sec) | Film Thickness (w/i 0.2 μm) |
|---|---|---|---|
| 110480-01 | 10 mA/cm² | 5 min | 1 μm |
| 110480-02 | 20 mA/cm² | 2 min, 30 sec | 1 μm |
| 110480-03 | 50 mA/cm² | 1 min | 1 μm |
| 110480-04 | 5 mA/cm² | 10 min | 1 μm |
| 110480-05 | 7.36 mA/cm² | 7 min, 9 sec | ≈1 μm |
| 110480-06 | 7 mA/cm² | 7 min, 9 sec | 1 μm |
| 110480-07 | 2 mA/cm² | 25 min | 1 μm |
| 110480-08 | 30 mA/cm² | 1 min, 40 sec | 1 μm |

TABLE IV

Series 2 Samples plated from Bath LC at 35° C. with pH = 6.5.

| Co Sample Number | Current Density | Total Plating Time (w/i 1 sec) | Film Thickness (w/i 0.2 μm) |
|---|---|---|---|
| 120480-01 | 10 mA/cm² | 5 min | 1 μm |
| 120480-02 | 20 mA/cm² | 2 min, 30 sec | 1 μm |
| 120480-03 | 5 mA/cm² | 10 min | 1 μm |
| 120480-04 | 35 mA/cm² | 1 min, 26 sec | 1 μm |
| 120480-05 | 50 mA/cm² | 1 min | 1 μm |
| 120480-06 | 2 mA/cm² | 25 min | 1 μm |
| 120480-07 | 15 mA/cm² | 3 min, 20 sec | 1 μm |
| 120480-08 | 3.5 mA/cm² | 14 min, 17 sec | 1 μm |
| 120480-09 | 1 mA/cm² | 50 min | 1 μm |

TABLE V

Series 3 Samples plated from Bath LC at 50° C. with pH = 6.5.

| Co Sample Number | Current Density | Total Plating Time (w/i 1 sec) | Film Thickness (w/i 0.2 μm) |
|---|---|---|---|
| 120580-01 | 10 mA/cm² | 5 min | 1 μm |
| 120580-02 | 20 mA/cm² | 2 min 30 sec | 1 μm |
| 120580-03 | 5 mA/cm² | 10 min | 1 μm |
| 120580-04 | 35 mA/cm² | 1 min 26 sec | 1 μm |
| 120580-05 | 50 mA/cm² | 1 min | 1 μm |
| 120580-06 | 2 mA/cm² | 25 min | 1 μm |
| 120580-07 | 70 mA/cm² | 43 sec | 1 μm |
| 120580-08 | 100 mA/cm² | 30 sec | 1 μm |

As in the case of the samples in Example 1, the three Series of Co films of Tables III, IV and V were subjected to x-ray diffraction measurement to determine the extent of the preferred orientation of the crystallites. The results of these three series of samples are plotted in terms of the $I_{(002)}/I_{BG}$, $I_{(100)}/I_{BG}$ and $I_{(101)}/I_{BG}$ ratios vs. current density in FIG. 13.

Figure 13:
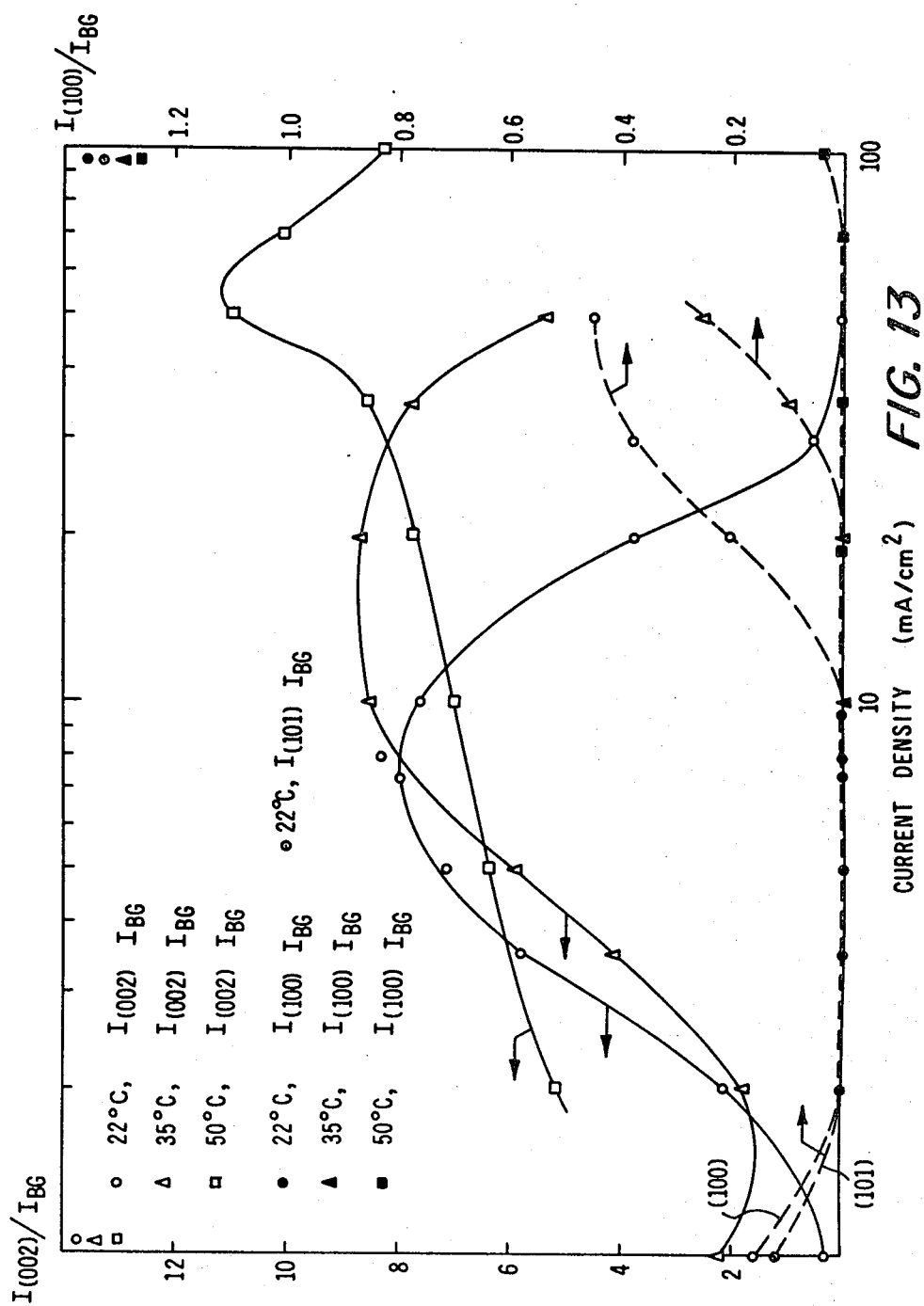
FIG. 13 is a graphic illustration of the diffraction intensity ratios vs. current density at first, second and third bath temperatures for magnetic film samples obtained from other plating bath in Example 2 and indicative of the extent of preferred orientation of the film particles for each of the particular film samples.

As shown in FIG. 13, the plated films from LC Bath demonstrate perpendicular anisotropy for a wide range of current densities, i.e., between 2 mA/cm² to 10 mA/cm² for a bath temperature of 22°, between 2 mA/cm² to 20 mA/cm² for a bath temperature of 35° and between 2 mA/cm² to 70 mA/cm² for a bath temperature of 50°.

The current density gives a fairly constant extent of preferred orientation and anisotropy over a fairly wide range of bath temperatures and current densities for practical fabrication of large area films. Therefore, one need not be concerned about precise bath conditions, temperatures or appied current densities to obtain desired uniformity in the preferred orientation of the crystallites over large areas of the film in the media production process. Hence the absence of precise control over bath temperatures and current densities drastically reduces the cost of the media fabrication process and media production while also permitting a more continuously reproducible magnetic media product.

Figure 14C:
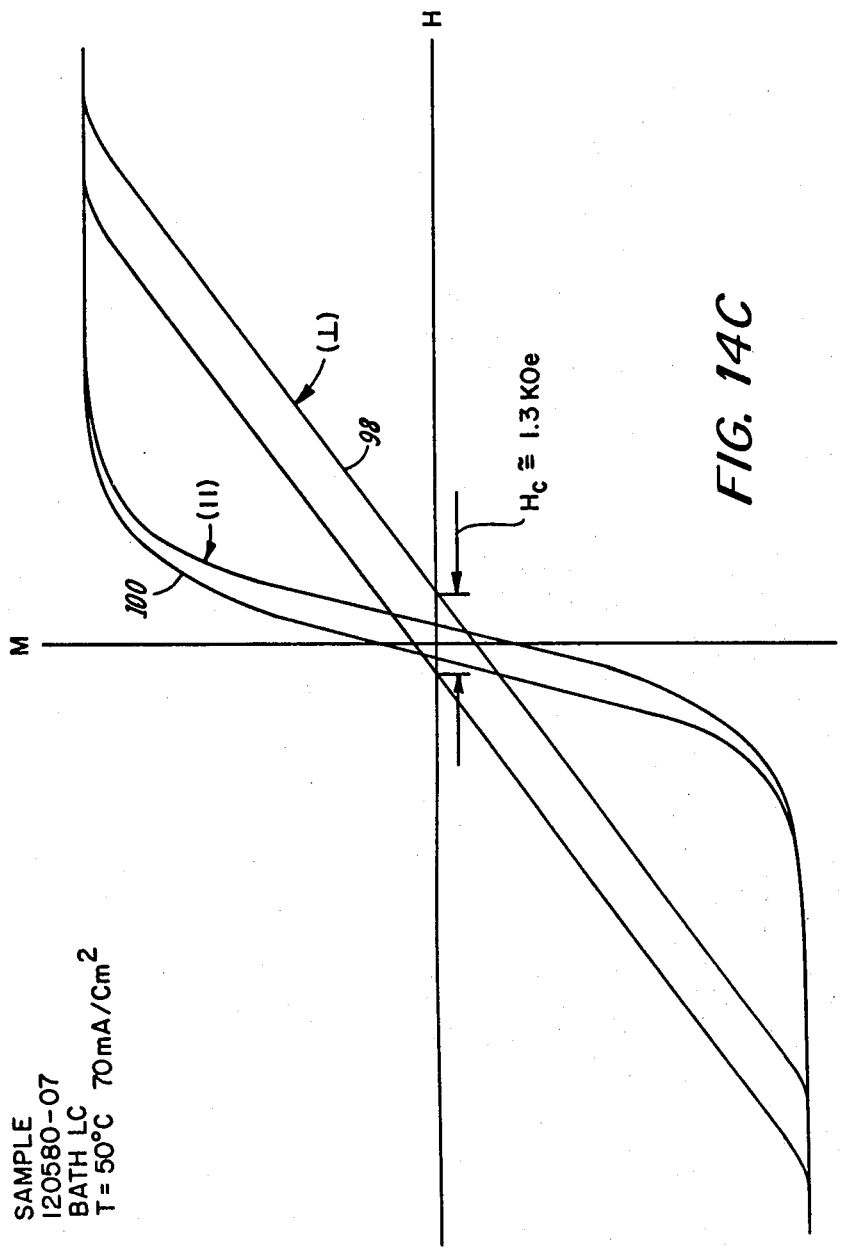
FIG. 14C discloses the traces of the M-H hysteresis loops taken with applied magnetic field parallel ( $\|$ ) and perpendicular ( $\perp$ ) to the film plane of an magnetic film sample having a perfect preferred orientation of FIG. 13 electroplated at the third bath temperature.

The preferred orientated films show a good parallelogram conditions for the perpendicular magnetic hysteresis loops, as exemplified by the loops illustrated in FIGS. 14A, B, C for three of the samples at respective bath temperatures of 22° C., 35° C. and 50° C. FIG. 14A shows the perpendicular and parallel magnetic hysteresis loops 90 and 92 for sample 110480-05 of Series 1 in Table III. The perpendicular magnetic hysteresis loop 90 shows good parallelogram definition with high coercivity, $H_c$, equal to about 1.1 kOe. FIG. 14B shows the perpendicular and parallel magnetic hysteresis loops 94 and 96 for example 120480-01 of Series 2 in Table IV. The perpendicular magnetic hysteresis loop 94 shows good parallelogram definition with high coercivity, $H_c$, equal to about 1.3 kOe. FIG. 14C shows the perpendicular and parallel magnetic hysteresis loops 98 and 100 for sample 120480-07 of Series 3 in Table V. The perpendicular magnetic hysteresis loop 98 shows good parallelogram definition with high coercivity, $H_c$, equal to about 1.3 kOe.

EXAMPLE 3

The same nonmagnetic conductive substrate 12 employed with the samples of Examples 1 and 2 was also employed with the samples of Example 3. However, the parameters of the plating bath used in Example 2 were changed and the bath was then designated as, "Bath I" for record keeping purposes. The plating bath solution comprised 1.7 molar/liter cobalt sulfamate, 0.2 molar/liter cobalt chloride, $CoCl_2$, and the pH of the solution was adjusted with a 0.1 $Ba(OH)_2$ solution to a value 6.5. The results for the designated electroplated film samples are set forth in Table VI.

TABLE VI

Samples plated from Bath I at 22° C. with pH = 6.5.

| Co Sample Number | Current Density | Total Plating Time (w/i 1 sec) | Film Thickness (w/i 0.2 μm) |
|---|---|---|---|
| 091280-05 | 5 mA/cm² | 10 min | 1 μm |
| 0991280-08 | 7 mA/cm² | 7 min, 9 sec | 1 μm |
| 091280-04 | 10 mA/cm² | 5 min | 1 μm |
| 091280-07 | 15 mA/cm² | 2 min, 30 sec | 0.75 μm |

Figure 15:
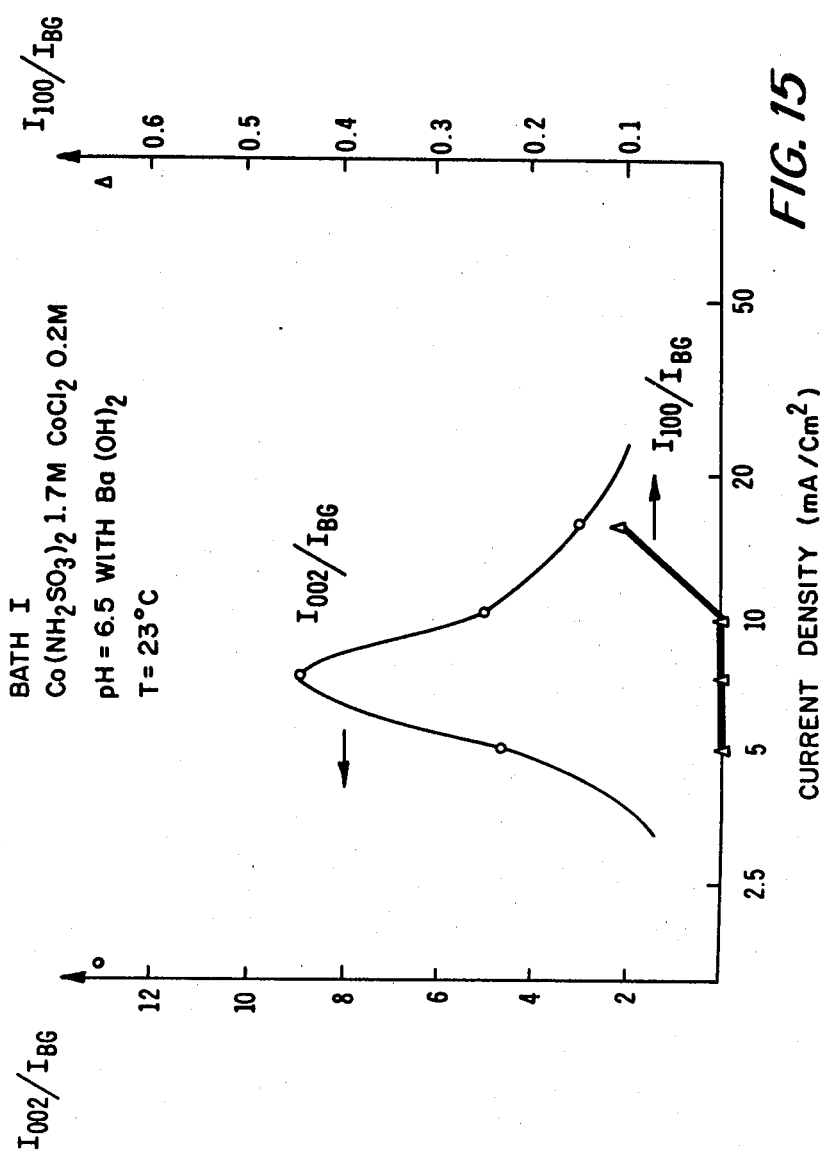
FIG. 15 is a graphic illustration of the diffraction intensity ratios vs. current density for magnetic film sample obtained from a different concentration of sulfamate base electroplating bath at the first temperature, as compared to previous examples, for the film samples of Example 3 and indicative of the preferred orientation of the film particles for a range of film samples.

As in the case of the samples in Examples 1 and 2, the Co films of Table VI were subjected to x-ray diffraction measurement to determine the extent of the preferred orientation of the crystallites. The results of these samples are plotted in terms of the $I_{(002)}/I_{BG}$ and $I_{(100)}/I_{BG}$ ratios vs. the current densities in FIG. 15.

The plated Co films from I Bath electroplating demonstrate good parallelogram conditions for the perpendicular hysteresis loop and perpendicular anisotropy for a range of current densities, i.e., between about 4.8 mA/cm² to 10 mA/cm² for a bath temperature of 22°. Again, a fairly constant extent of preferred orientation and anisotropy over a fairly wide range of current densities for practical fabrication of large area films is demonstrated. Based on the x-ray diffraction analysis, Co films with preferred orientation, i.e. crystallographic "c" axis of all the crystallites in the film oriented normal to the film plane, may be obtained employing the I Bath with a plating bath temperature of 22° C. and a current density of between about 5 to 10 mA/cm². Above about 10 mA/cm², the (100) diffraction appears, indicating the presence of some particles with their "c" axis oriented in directions other than normal to the plane of the film.

EXAMPLE 4

The same nonmagnetic conductive substrate 12 employed with the samples of previous Examples was also employed with the samples of Example 4. However, a different plating bath was used and was designated as, "Bath A" for record keeping purposes. The plating bath solution comprised 1 molar/liter cobalt sulfate, $CoSO_4$, 0.1 molar/liter cobalt chloride, $CoCl_2$, and the solution was buffered with 30 grams/liter $H_3BO_3$ and the pH of the solution was adjusted with NaOH solution to a value of 6.35. The results for the designated electroplated film samples are set forth in Table VII.

TABLE VII

Samples plated from Bath I at 23° C. with pH = 6.35.

| Co Sample Number | Current Density | Total Plating Time (w/i 1 sec) | Film Thickness (w/i 0.2 $\mu$m) |
| --- | --- | --- | --- |
| 082680-01 | 50 mA/cm$^2$ | 1 min | 1 $\mu$m |
| 082680-03 | 40 mA/cm$^2$ | 1 min, 15 sec | 1 $\mu$m |
| 082680-04 | 30 mA/cm$^2$ | 1 min, 40 sec | 1 $\mu$m |
| 082680-05 | 20 mA/cm$^2$ | 2 min, 30 sec | 1 $\mu$m |
| 082680-06 | 70 mA/cm$^2$ | 43 sec | 1 $\mu$m |
| 082680-07 | 100 mA/cm$^2$ | 30 sec | 1 $\mu$m |
| 082680-08 | 25 mA/cm$^2$ | 2 min | .1 $\mu$m |
| 082680-09 | 10 mA/cm$^2$ | 5 min | 1 $\mu$m |

As in the case of previous Examples, the Co films of Table VII were subjected to x-ray diffraction measurement to determine the extent of the preferred orientation of the crystallites. The results of these samples are plotted also in terms of the $I_{(002)}/I_{BG}$ and $I_{(100)}/I_{BG}$ ratios vs. the current densities as in FIG. 16.

The plated Co films from Bath A electroplating demonstrate good parallelogram conditions for a range of current densities, i.e., between about 40 mA/cm$^2$ to 70 mA/cm$^2$ for a bath temperature of 23° C. Again, a fairly constant extent of preferred orientation and anisotropy over a fairly wide range of current densities for practical fabrication of large area films is demonstrated. Based on the x-ray diffraction analysis, Co films with preferred orientation, i.e. crystallographic "c" axis of all the crystallites in the film oriented normal to the film plane, may be obtained employing the A Bath with a plating bath temperature of 23° C. and a current density within the above mentioned range. Below about 40 mA/cm$^2$ and above about 70 mA/cm$^2$, the (100) diffraction appears, indicating the presence of some particle with "c" axis oriented in directions other than normal to the plane of the film.

While the film samples of this example did exhibit preferred orientation with good parallelogram perpendicular loop conditions, the film samples did have slightly lower coercivity, $H_c$ as compared to previous examples. For example, the $H_c$ for sample 082680-06 was about 650 Oe, for samples 082680-03 and 082680-04 about 700 Oe and for sample 082680-08 about 720 Oe.

EXAMPLE 5 The plating conditions for obtaining a perfect preferred oriented Co film of Example 1 were rerun with different types of nonmagnetic conductive supports. First, the substrate 12 in all cases was a conductive substrate. Secondly, the overcoatings were of three different types. Support A comprised an aluminum substrate overcoated with electroless copper followed by an overcoating of nickel phosphorus, NiP. Support B comprised a copper tape substrate overcoated with nickel phosphorus, NiP. Support C comprised an aluminum substrate overcoated Sputtered Co-Re having preferred oriented HCP CoRe crystallites with 2000 Angstroms thick with "c" axis of all the crystallites particle oriented normal to the film plane.

The electroplated Co films produced at the designated current densities and film thicknesses of the samples in Tables I and II on supports A, B and C produced essentially same results, relative to hysteresis characteristics and preferred anisotropic orientation, i.e. crystallographic "c" axis and long axis of the acicular particle of all the crystallites in the film oriented normal to the film plane, as achieved with the glass supports with conductive coatings originally used in Example 1.

II. POST TREATMENTS
EXAMPLE 6

This example relates to electroplated Co films followed by enhanced grain boundary reaction. The post treatment is an enhanced grain boundary diffusion accomplished by an electrochemical cathodic treatment of the magnetic film.

The same nonmagnetic substrate 12 employed with the samples of Example 1 was employed with the samples of this Example 6. The plating bath was also the same except for the molar content of the cobalt chloride. The plating bath solution was identical to that of Example 2 and comprised 1 molar cobalt sulfamate, 0.05 molar/liter cobalt chloride, $CoCl_2$, and the pH of the solution was adjusted by a 0.1 molar/liter $Ba(OH)_2$ solution to a value of 6.5. This bath was designated as, "Bath LA" for record keeping purposes. The film plating conditions in all cases for the four samples in Table VIII, are that the bath temperature was 35° C. and the current density was 20 mA/cm$^2$. Film thicknesses were all about 1 $\mu$m.

Cathodic treatment comprises the employment of an acid solution of 0.1 Molar/liter of Thiorea and 30 cc/liter of $H_2SO_4$ (concentrated) instead of solution 44 in the electroplating apparatus 40 of FIG. 5. Upon the application of an applied voltage between the Co sample as cathode 48 and the anode 46, hydrogen generated by cathodic action of the solution will diffused into the film. The rate of diffusion of hydrogen will be faster along the grain boundary 22 of the film 14 than into the crystallite bulk, particularly at the grain front 52. Consequently, the spacing between the acicular crystallites will be occupied by a nonmagnetic Co-H compound or alloy thereby increasing the separation between the crystallites while decreasing the demagnetized field, $H_d$.

The current densities, treatment time and bath temperatures in the cathodic treatment for four samples is given in Table VIII.

TABLE VIII

| Co Sample Number | Current Density | Total Treatment Time (w/i 1 min) | Bath Temperature |
| --- | --- | --- | --- |
| 100180-01 | 0 | 0 | 25° C. |
| 100380-05 | 4.5 mA/cm$^2$ | 4 min | 25° C. |
| 100680-05 | 4.5 mA/cm$^2$ | 8 min | 25° C. |
| 100680-04 | 10 mA/cm$^2$ | 8 min | 25° C. |

Figure 17A:
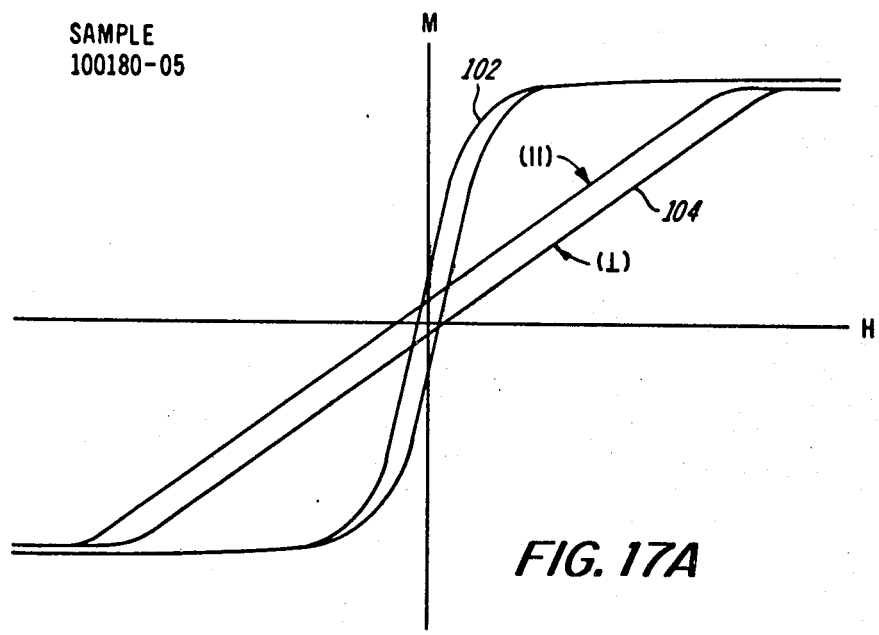
FIGS. 17A, 17B, 17C and 17D disclose the traces of the M-H hysteresis loops taken with applied magnetic field parallel ( $\|$ ) and perpendicular ( $\perp$ ) to the film plane of the four magnetic film samples of Example 6, these samples having previously received a post treatment by hydrogen diffusion in a cathodization.
Figure 17B:
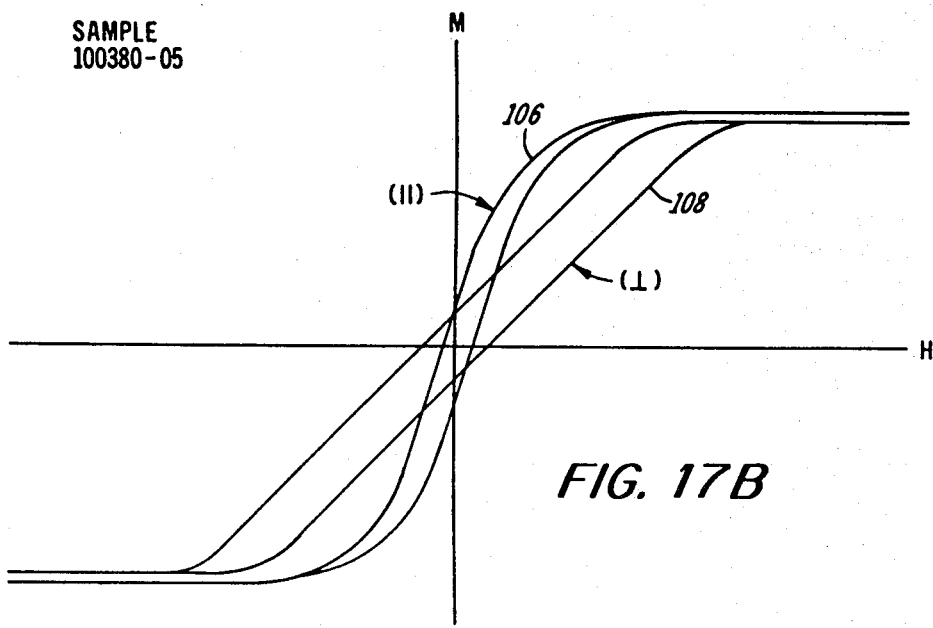
Figure 17C:
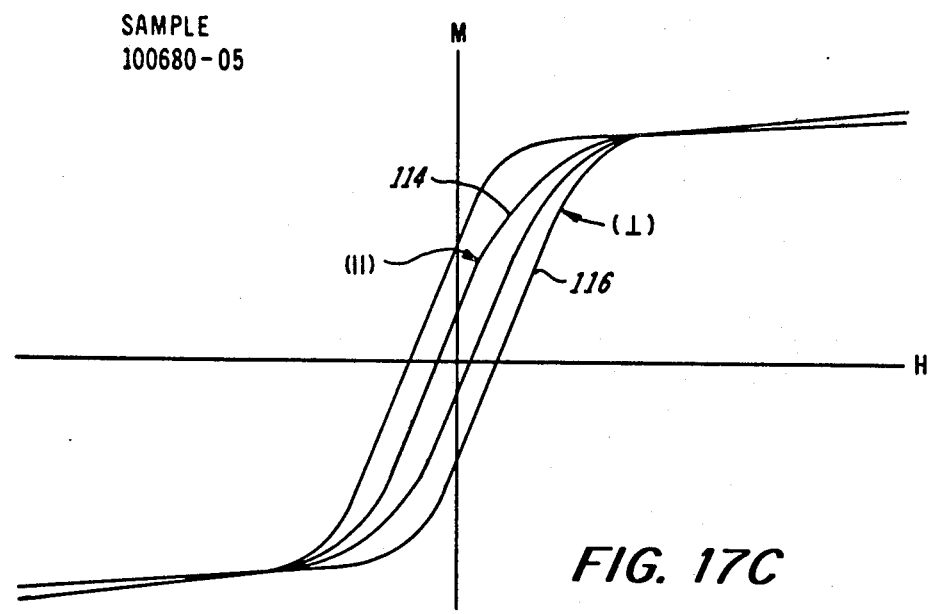
Figure 17D:
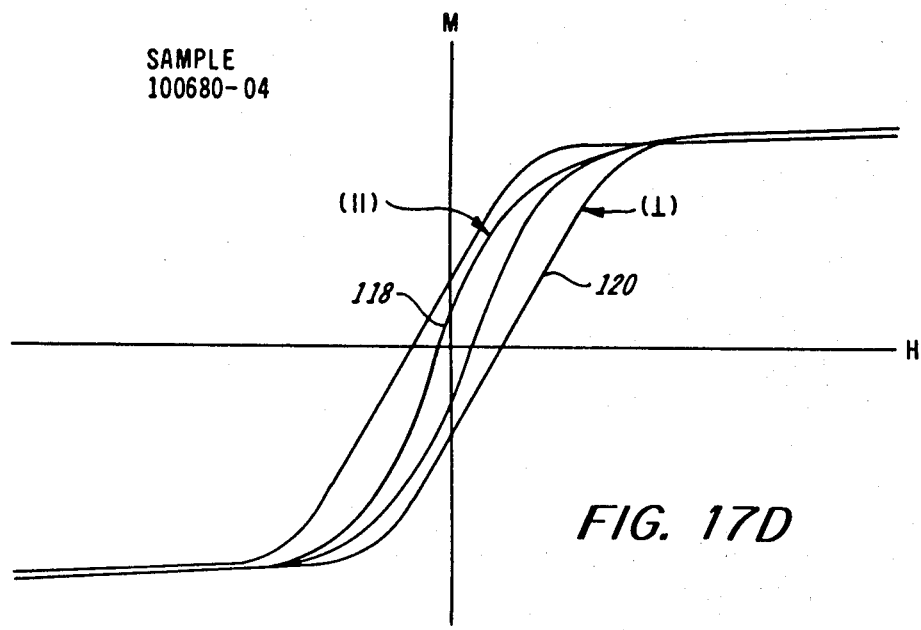

FIGS. 17A, B, C, and D show the perpendicular and parallel magnetic hysteresis loops for these four film samples, respectively. The hysteresis loop traces for comparison of sample 100380-04 in the case where no treatment is applied (parallel ($\parallel$) and perpendicular ($\perp$) loops 102 and 104 in FIG. 17A) and of samples 100380-05, 100680-05 and 100680-04 in the cases where treatment is applied [parallel ($\parallel$) and perpendicular ($\perp$) loops 106 and 108 in FIG. 17B, parallel ($\parallel$) and perpendicular ($\perp$) loops 114 and 116 in FIG. 17C and parallel ($\parallel$) and perpendicular ($\perp$) loops 118 and 120 in FIG. 17D], a slight increase in coercivity $H_c$, and a large decrease in demagnetizing field $H_d$ as indicated by extensive decrease in inclination of the perpendicular hysteresis loops 108, 116 and 118 in FIGS. 17B, C, D. Thus, the enhanced grain boundary diffusion by hydrogen cathodization effectively increases the intergranual separation while decreasing the demagnetization and, hence, increasing the $M_r/M_s$ ratio as well as increasing the corecivity, $H_c$.

Cathodic treatment of other samples plated at higher current densities, for example, from above 20 mA/cm$^2$ to 100 mA/cm$^2$, revealed that the effectiveness of this treatment to provide intergrandular crystallite separation was not as effective as in the case of sample plated at lower current densities, e.g., below 20 to 30 mA/cm$^2$, because of the existence of nonpreferred oriented particles in the film.

EXAMPLE 7

This example relates to electroplated Co films followed by another kind of enhanced grain boundary reaction. The post treatment is an enhanced grain boundary etching accomplished by an anodizing treatment of the magnetic film.

The same nonmagnetic substrate 12 employed with the samples of Example 1 was employed with the samples of this Example 7. The plating bath was also the same except for the molar content of the cobalt chloride. The plating bath solution was identical to that of Example 6 and comprised the LA Bath. The plating conditions in all cases for the three samples in Table IX are that the plating bath temperature was 50° C. and the current density was 40 mA/cm$^2$. Film thicknesses were all about 1 μm.

Three electroplated Co film samples with preferred orientation produced from the above bath were then secured on the anode 46 of the apparatus 40. Instead of solution 44, an acid bath comprising a solution of 0.1 mole/liter of Thiorea and 30 cc/liter of concentrated H$_2$SO$_4$ is employed in the tank 42. In this arrangement, the material would preferentially etch away along the intergranual boundary 22 between the acicular particles under applied electrical current and thereby effectively increase the crystallite separation. Consequently the demagnetization field of the film will be decreased, $M_r/M_s$ ratio will be increased and $H_c$ will be increased.

The current densities, anodizing time and bath temperatures for three samples is given in Table IX.

TABLE IX

| Co Sample Number | Current Density | Total Treatment Time (w/i 1 min) | Bath Temperature |
|---|---|---|---|
| 101380-01 | 2.5 mA/cm$^2$ | 2 min | 24° C. |
| 101380-03 | 2.5 mA/cm$^2$ | 5 min | 24° C. |
| 101380-02 | 2.5 mA/cm$^2$ | 8 min | 24° C. |

Figure 18A:
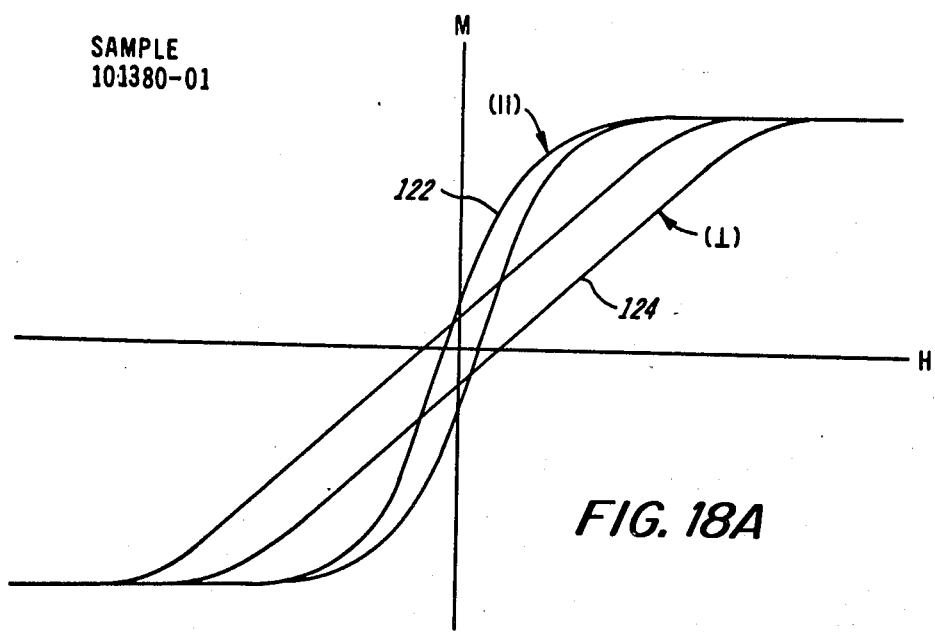
FIGS. 18A 18B and 18C disclose the traces of the M-H hysteresis loops taken with applied magnetic field parallel ( $\|$ ) and perpendicular ( $\perp$ ) to the film plane of the three magnetic film samples of Example 7, these samples having previously received a post treatment by enhanced grain boundary etching using an anodization process.
Figure 18B:
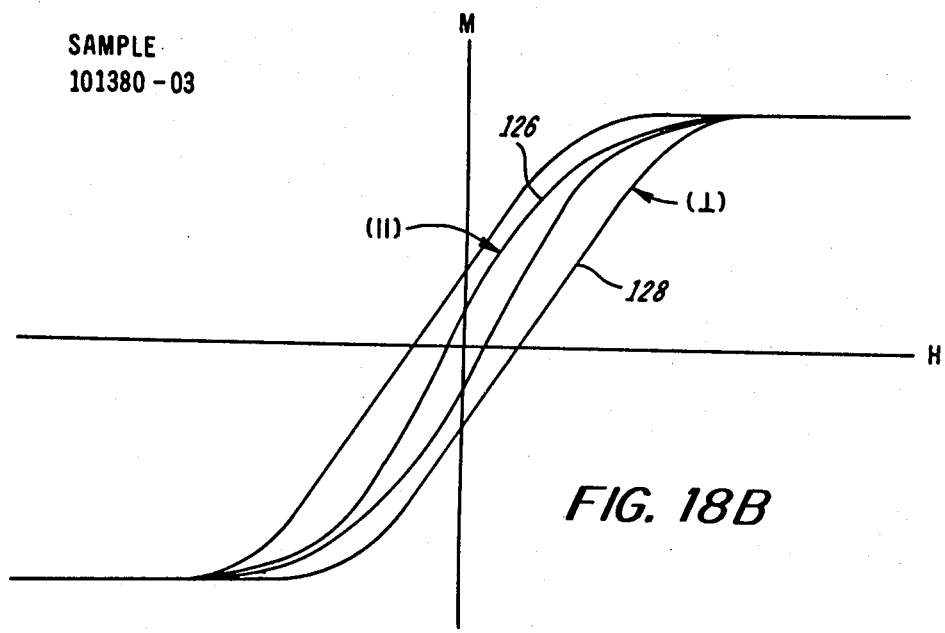
Figure 18C:
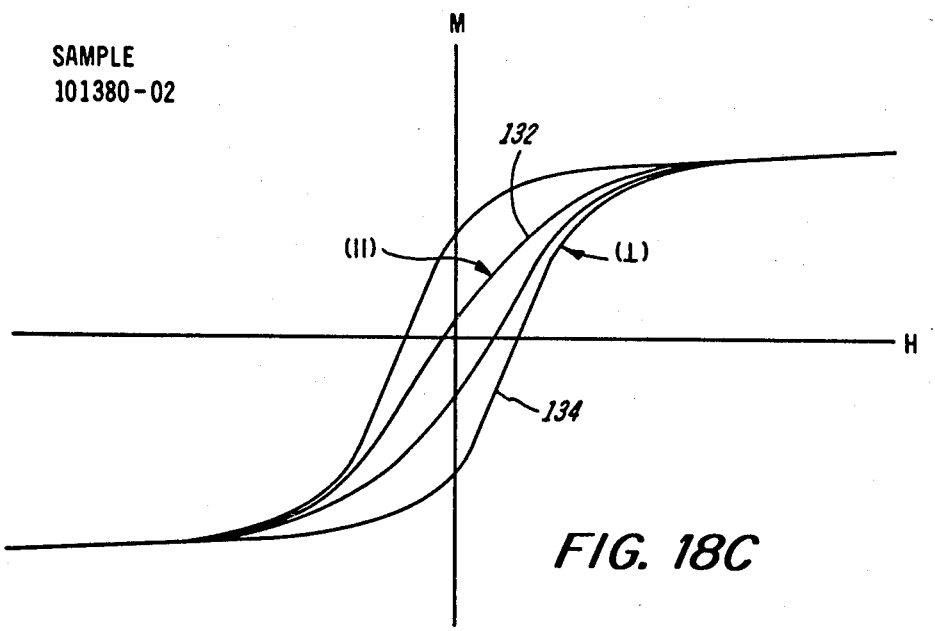

FIGS. 18A, B, and C show the parallel ($\parallel$) and perpendicular ($\perp$) magnetic hysteresis loops 122 and 124, 126 and 128, and 132 and 134, respectively, for these three film samples.

It should be noted that anodization effectively reduces the demagnetization field, $H_d$, as indicated by the decrease in inclination of perpendicular ($\perp$) hysteresis loops 124, 128 and 134 in comparison with the perpendicular ($\perp$) hysteresis loop 104 of the untreated film of FIG. 17A and, hence, increase the ratio of $M_r/M_s$ and increase the coercivity, $H_c$, of the magnetic Co film by electrochemically etching away the material between the crystallities, which effectively increases their separation.

This anodizing treatment and the cathodic treatment of Example 6 demonstrate that by using the technique of enhanced grain boundary etching under electrochemical method, the separation between the acicular crystallites can effectively increase and, hence, reduce the demagnetization effect as well as increase the values for $H_c$ and $M_r$. Therefore, one can use these treatment techniques to tailor a film for particular hysteretic properties desired for specific perpendicular recording applications.

EXAMPLE 8

This example relates to electroplated Co films followed by still another kind of post treatment. The post treatment is an enhanced grain boundary etching accomplished by a chemical etching treatment of the magnetic film in an acid bath.

The preferred oriented electroplated Co film fabricated in accordance with the LA Bath of Example 7 was used for the post treatment of this Example 8. An etchant bath was prepared in an etching tank comprising concentrated H$_2$SO$_4$ solution of 0.1 mole/liter. The film sample was placed in the acid bath and material was preferentially etched away along the grain boundary 22 at a faster rate than the bulk of the acicular crystallite. This resulted in increased intercrystallitic separation. Table X shows the etching treatment time and bath temperature for the sample.

TABLE X

| Co Sample Number | Total Treatment Time (w/i 1 min) | Bath Temperature |
|---|---|---|
| 101480-05 | 8 min | 24° C. |

Figure 19:
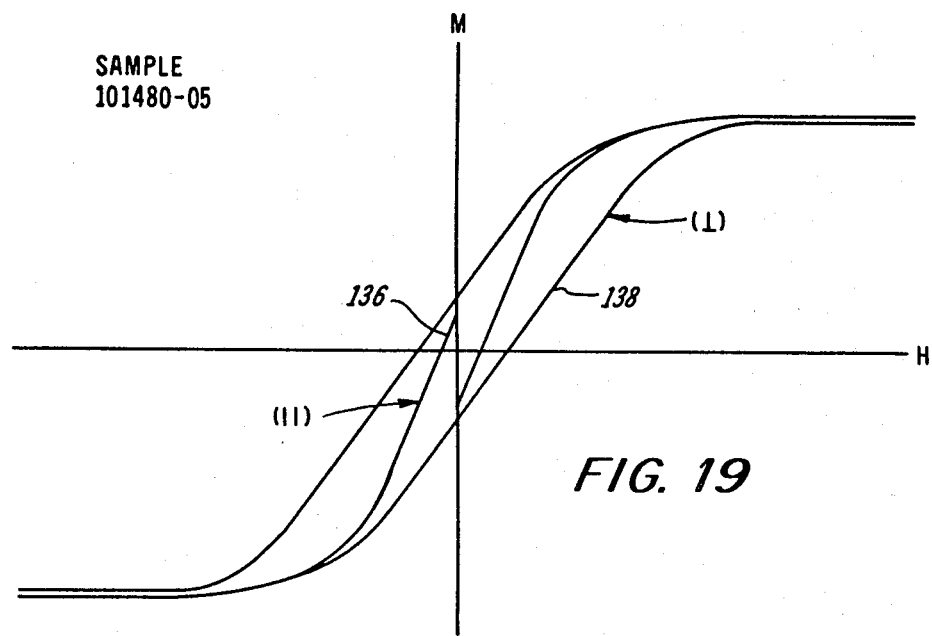
FIG. 19 discloses the traces of the M-H hysteresis loops taken with applied magnetic field parallel and perpendicular ( $\perp$ ) to the film plane for the magnetic film sample of Example 8 after post treatment by simple chemical etching.

An examination of the parallel ($\parallel$) hysteresis and perpendicular ($\perp$) loops 136 and 138, shown in FIG. 19 disclose a decrease in the demagnetization field, $H_d$, an increase in the $M_r/M_s$ ratio, and an increase in the $H_c$, as compared to an untreated Co film sample fabricated in the same LA Bath. However, the effect of this etching treatment is not as pronounced as the anodizing treatment of Example 7 for comparable times of treatment.

EXAMPLE 9

As previously indicated, the post treatments of Examples 6 through 9 are not limited to films produced by electroplating method described herein. These treatments may readily be applied to other magnetic films fabricated by other methods that provide the film with perpendicular anisotropy useful for perpendicular recording. In this Example, enhanced grain boundary diffusion is applied to a film having perpendicular anisotropy fabricated from a conventional sputtering process.

Sputtered Co-Re alloy films were produced with conventional sputtering equipment to have preferred orientation in crystallographic and crystallite shape similar to that of the electroplated films previously discussed. The method and conditions of obtaining the preferred oriented film is similar to the process described in the previous publication entitled "High Coercivity and High Hysteresis Loop Squareness of Sputtered Co-Re Thin Film" by Tu Chen and G. B. Charlan published in the *Journal of Applied Physics*, Volume 50, page 4285 et al., 1979. The sample produced for this example was sputtered from alloy target consisting of Co plus 10 atomic per cent Re. The sputtering was carried out under a 75 micron argon pressure. The film was deposited on the glass substrate at 100° C. with deposition rate of 0.5 Angstroms per second until a total film thickness of about 3000 Angstroms was achieved. The film as deposited show perfect anisotropy with "c" axis of all crystallites in the film oriented normal to the film plane as revealed by the x-ray diffraction method described in connection with Example 1 and FIGS. 9A and 9B. In these films, perpendicular anisotropy with accompanying reduction of the demagnetizing field is accomplished by reducing the magnetization of the film through alloying Co with Re. Therefore, for these as-deposited sputtered films, their demagnetization field, $H_d$, and coercivity, $H_c$, cannot be improved beyond the limits of these properties now known to be obtained in conventional sputtered fabrication.

For perpendicular recording media application, a further decrease in demagnetization effect and increase in the $M_r/M_s$ ratio and $H_c$ is often required for low frequency recording. Therefore, to further decrease the demagnetization field and increase the value of $M_r/M_s$ ratio and $H_c$ of the film from the as-sputtered state, the enhanced grain boundary diffusion treatment is applied as a post treatment to the previously sputtered Co-Re film samples to increase the magnetic separation between the crystallites and thereby decrease the $H_d$ and increase the $M_r/M_s$ ratio and the $H_c$. Specifically in this example, a sputtered film designated as Co-Re 121478-01 was heat treated in an ambient atmosphere in a furnace at 300° C. for 18 hours to enhance the grain boundary diffusion by oxidation.

Figure 20A:
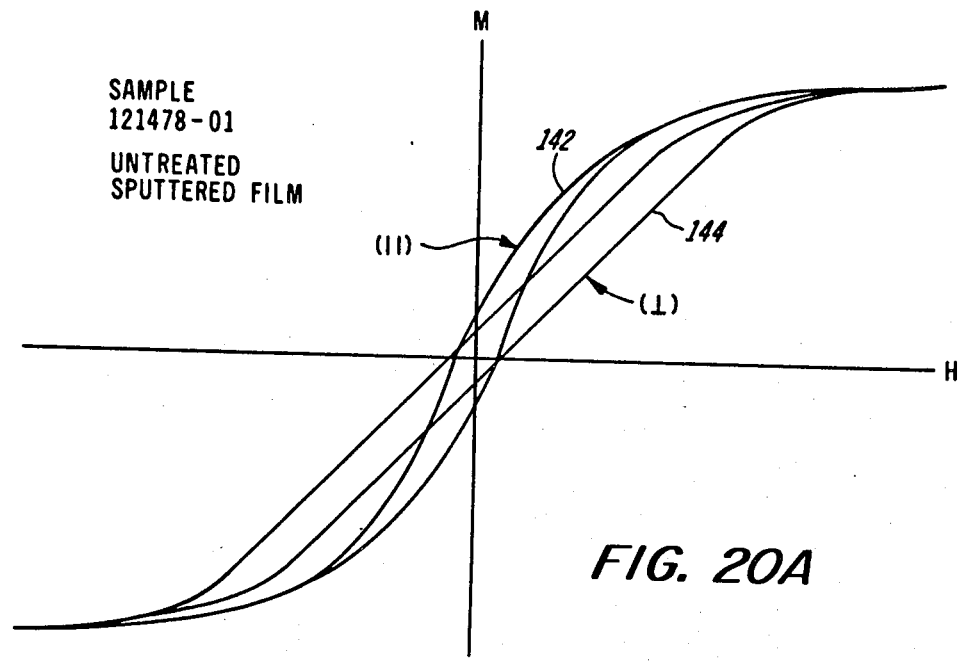
FIGS. 20A and 20B discloses the traces of the M-H hysteresis loops taken with applied magnetic field perpendicular ( $\perp$ ) to the film plane for the magnetic film sample of Example 9 for, respectively, before and after post treatment by oxidation illustrating the enhanced grain boundary diffusion mechanism for sputtered films.
Figure 20B:
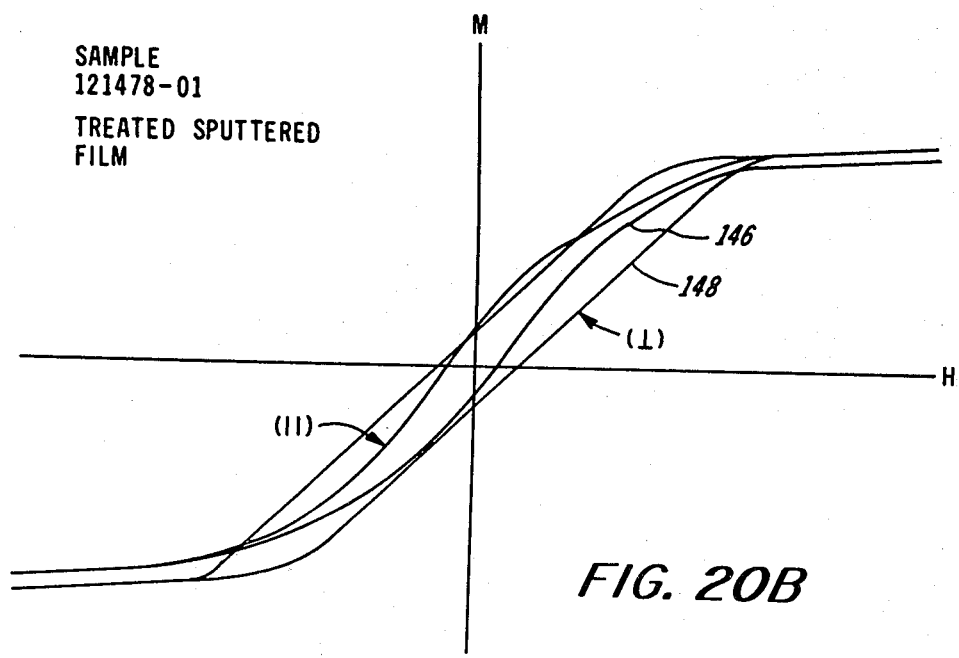

The results of the magnetic hysteresis measurements for the perpendicular ($\perp$) and parallel ($\parallel$) hysteresis loops for the as-deposited and oxidation annealing are shown, respectively, in FIGS. 20A and 20B. By comparing the relative inclinations of parallel ($\parallel$) loops 142 and 146 respectively for untreated and treated films with the inclinations of perpendicular ($\perp$) loops 144 and 148 respectively for untreated and treated films, it can be seen that the treated film shows a decrease in demagnetization field, as indicated by increase in inclination of the perpendicular ($\perp$) loop 148 with respect to the parallel ($\parallel$) loop 146 and thereby decrease the $H_d$ and increase the $M_r/M_s$ ratio and the $H_c$. Specifically in this example, a sputtered film designated as Co-Re 121478-01 was heat treated in an ambient atmosphere in a furnace at 300° C. for 18 hours to enhance the grain boundary diffusion by oxidation.

The results of the magnetic hysteresis measurements for the perpendicular ($\perp$) and parallel ($\parallel$) hysteresis loops for the as-deposited and oxidation annealing are shown, respectively, in FIGS. 20A and 20B. By comparing the relative inclinations of parallel ($\parallel$) loops 142 and 146 respectively for untreated and treated films with the inclinations of perpendicular ($\perp$) loops 144 and 148 respectively for untreated and treated films, it can be seen that the treated film shows a decrease in demagnetization field, as indicated by decrease in inclination of the perpendicular ($\perp$) loop 148 with respect to the parallel ($\parallel$) loop 146. Also the coercivity, $H_c$, as well as the $M_r/M_s$ ratio of the treated film are increased from that of the untreated film. The result of this example illustrates that the enhanced grain boundary diffusion principle can also be applied also to sputtered films having perpendicular anistropy.

While the invention has been described in conjunction with specific embodiments, it is evident that many alternatives, modifications and variations will be apparent to those skilled in the art in light of the foregoing description. One example is the employment of other magnetic materials and alloys, other than Co or Co alloys, in the practice of the invention. Accordingly, the invention is intended to embrace all such alternatives, modifications and variations as fall within the spirit and scope of the appended claims.

What is claimed is:

1. A method of post treatment to a continuous thin film magnetic medium comprising a substrate upon which is deposited a thin magnetic layer comprising acicular shaped crystalline magnetic particles with the crystallographic "c" axis of the crystal in each particle oriented parallel to the longitudinal axis of the particle acicula and the longitudinal axis of the acicular particles oriented substantially normal to the plane of said magnetic layer, said post treatment effectively increasing the separation between magnetic particles and thereby increasing their coercivity while decreasing their demagnetization field of the film, said method comprising the step of utilizing enhanced grain boundary reaction at the interganular boundary of said particles to achieve particle separation effectively either by diffusing the magnetic layer with a reagent or etching the magnetic layer with an etching agent.

2. The method of claim 1 wherein the step of utilizing enhanced grain boundary reaction consists of heating the magnetic layer in the presence of an oxidizing environment thereby causing diffusion of the oxygen into the outer portions of said acicular particles comprising the magnetic layer.

3. The method of claim 2 wherein the step of utilizing enhanced grain boundary reaction consists of the further sequential step of preferentially etching with a solution containing the etching agent and immersing the magnetic layer into said solution thereby causing further removal of an outer portion of said acicular particles comprising the magnetic layer.

4. The method of claim 1 wherein the step of utilizing enhanced grain boundary reaction consists of heating the magnetic layer in the presence of the vapor phase of an element that is dissimilar to the material comprising said acicular particles thereby causing diffusion of the element into the outer portions of said acicular particles to form a nonmagnetic layer surrounding an inner magnetic core.

5. The method of claim 4 wherein the step of utilizing enhanced grain boundary reaction consists of the further sequential step of preferentially etching with a solution containing the etching agent and immersing the magnetic layer into said solution thereby causing further removal of an outer portion of said acicular particles comprising the magnetic layer.

6. The method of claim 1 wherein the step of utilizing enhanced grain boundary reaction consists of preferentially etching with a solution containing the etching agent and immersing the magnetic layer into said solution thereby causing removal of an outer portion of said acicular particles comprising the magnetic layer.

7. A magnetic recording medium post treated according to any one of the methods of claim 1 through claim 6 wherein said magnetic layer comprises magnetic acicular particles of Co or an alloy thereof.

8. A magnetic recording medium post treated according to any one of the methods of claim 1 through claim 6.

9. A magnetic recording medium post treated according to any one of the methds of claim 1 through claim 6 and wherein said magnetic layer has been previously fabricated by either an electrochemical plating method, a sputtering method or vacuum deposition method.

* * * * *